United States Patent [19]

Chaikin et al.

[11] 4,267,573
[45] May 12, 1981

[54] IMAGE PROCESSING SYSTEM

[75] Inventors: George M. Chaikin, New York, N.Y.; Carl F. R. Weiman, Norfolk, Va.

[73] Assignee: Old Dominion University Research Foundation, Norfolk, Va.

[21] Appl. No.: 915,453

[22] Filed: Jun. 14, 1978

[51] Int. Cl.³ .............................................. G06F 3/14
[52] U.S. Cl. .................................. 364/515; 340/724; 340/727; 364/518
[58] Field of Search ............... 364/515, 518, 570, 520, 364/822, 825; 340/723–728, 731, 743; 365/18, 25, 10; 307/221 R; 328/225

[56] References Cited

U.S. PATENT DOCUMENTS

| 3,637,997 | 1/1972 | Petersen | 340/731 |
| 3,976,982 | 8/1976 | Eiselen | 340/727 |
| 3,988,728 | 10/1976 | Inoue et al. | 340/724 |
| 4,073,010 | 2/1978 | Casasent et al. | 364/822 |
| 4,084,255 | 4/1978 | Casasent et al. | 364/822 |
| 4,099,249 | 7/1978 | Casasent | 364/822 |

OTHER PUBLICATIONS

Casasent et al., "New Optical Transforms for Pattern Recognition"; Proc. of IEEE, vol. 65, No. 1, Jan. 1977; pp. 77–84.

Primary Examiner—Errol A. Krass
Attorney, Agent, or Firm—Darby & Darby

[57] ABSTRACT

An image processing system is described in which an image is converted into a plurality of image elements or cells which are arranged in a predetermined pattern. These cells are then simultaneously rearranged into a second predetermined pattern to provide a transformed representation of the original image. In this transformed state, the positions of all of the cells may be simultaneously shifted in a manner which produces modifications of the original image, such as scaling or rotating. The highly parallel manner in which the present system manipulates the image cells allows the desired image modifications to be effected more simply and rapidly than has been previously possible. In a preferred embodiment of the invention these image cell manipulations are performed in a three dimensional shift register of novel design. A number of alternative embodiments of the invention are set forth which are of particular value in pattern recognition systems and in graphic display systems in which the ability to modify or animate images is desired.

50 Claims, 14 Drawing Figures

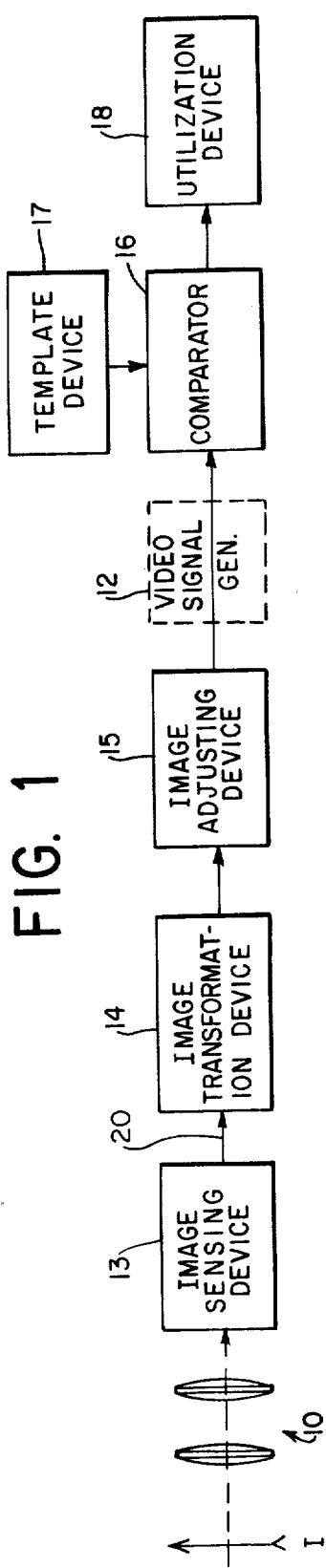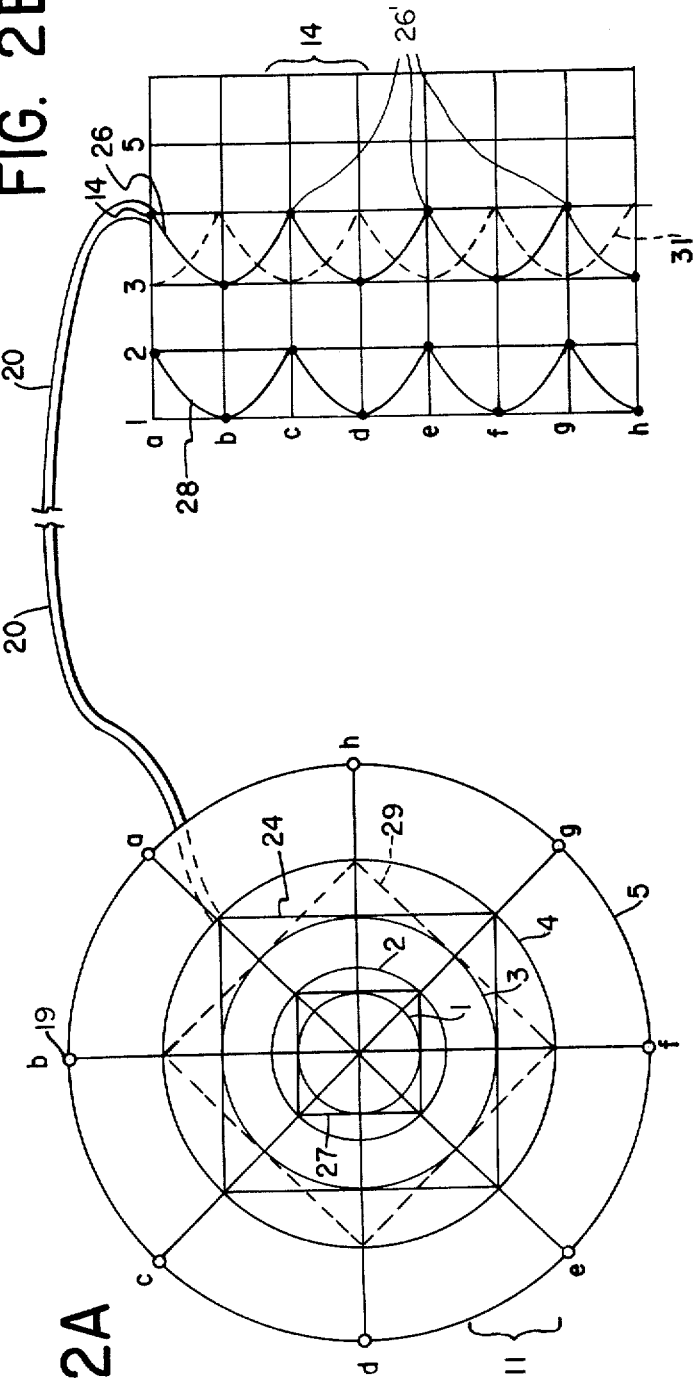

IMAGE PROCESSING SYSTEM

The present invention relates to image-processing procedures and systems and in particular to an image-processing procedure and system in which an image of a scene is converted into a plurality of image elements which are subsequently arranged in a special pattern to provide a transformed representation of the original image. In such a transformed state, certain operations or computations may be performed on the image elements such that modifications of the original image (such as scaling larger or smaller, or rotating) may be effected more simply and rapidly than has been possible heretofore. Such procedures and apparatus may be used for pattern recognition, by comparison with a standard pattern (i.e., a "template"), or in image-modifying or image-animation applications, such as computer graphics.

In pattern recognition applications, the picture being analyzed may be a two-dimensional representation of a three-dimensional scene or object as projected by a camera lens. This two-dimensional image will undergo various geometric transformations if for example, the camera (or viewing point) is moved. Where, for example, the scene is to be recognized from a variety of different viewing positions, the image must be computationally scaled or rotated to compensate for the different camera viewpoints.

Heretofore, such images have been placed in machine-readable form by digitization, that is, the image has been divided into a regular, linear, two-dimensional array of image cells or elements, a process often referred to as rectilinear digitization. Each image element is then characterized by a digital signal having components representing the location (i.e., "address") of the element and other components representing the nature of the image element (e.g., brightness, color, etc.). Rotational compensation or modification of such a digitized image has heretofore been effected computationally by performing a plurality of matrix multiplications on the digitized image signal, that is, a set of multiplications and additions are performed upon the representation of the location of each image element to be rotated. This provides the data signifying the location of the corresponding image element of the rotated image, such that upon reconstituting an image by using the computed data, the resulting image is the rotated version of the original image. These matrix multiplications thus correspond to physical displacement of the object, or of the viewing camera with respect to the object, whose image is being displayed. Generally, such a computation must be applied to every image point in a relatively short period of time (particularly where the appearance of smooth motion is desired) and in many situations must be applied to an enormous number of image points. For suitable detail in an image, a million image elements may be involved.

Where the digitized image is to undergo changes in scale, such as magnification or shrinkage, a similar computational problem exists. Generally, picture magnification is not a simple problem if the image has been rectilinearly digitized. Matrix multiplications similar to those described in connection with image rotation must be performed to effect such transformation of the image computationally.

These prior systems therefore require complicated and expensive implementation. Moreover, since the computations may be effected realistically only on images digitized into relatively few image points, the resulting pictures may have a simple or artificial appearance owing to relatively poor resolution capabilities.

In a typical display system, the screen or display space of the display device may be thought of as comprising a plurality of picture elements or cells (sometimes called "pixels") arranged in rows and columns. Each point may therefore be defined by the X and Y coordinates of a cartesian grid. Data representing, for example, the intensity or color of light to be displayed at each particular segment of the screen may be produced in known manner and stored in a random-access memory of a general purpose computer, along with data representing the X and Y coordinates of that element's position on the screen.

To cause an image to be displayed, the computer transfers the image information to a frame buffer or storage array the individual elements of which are arranged to form a Cartesian grid corresponding to the Cartesian grid formed by the picture elements or raster of the display screen. A display control unit retrieves the data from the display buffer in accordance with the particular raster of the display device and activates the display device to display an image corresponding to the data stored in the frame buffer. Thus, the X and Y coordinate data stored in the computer determines the position in the frame buffer in which each unit of image data is stored and the pattern of data stored in the frame buffer determines the image to be displayed.

It will be noted that in alternative embodiments of such an arrangement, the data stored in the computer may be limited to that representing important picture points, such as the end points of line segments or portions of curves, and the image portions between such end points are then automatically generated to re-create the line segments or curve portions.

The images produced by such embodiments, however, often have a simple artificial look because of the relatively small number of defined image segments, and the resulting smooth, mathematically defined surfaces.

In display systems, such as the ones described above, operations such as causing the display image to be rotated by a particular angle about a given point or "center of rotation", typically require the performance of the following steps by the computer:

1. "Normalizing" the currently stored X and Y coordinates of each unit of image data so that the unit of data representing the center of rotation will be moved to the origin (X=0, Y=0) of the coordinate system, and all of the other units of data will be moved by corresponding distances. This normalization operation involves subtracting the original X coordinate of the selected center of rotation from the original stored X coordinate of each of the data units representing the picture elements, and performing a similar operation upon each of the stored Y coordinates.

2. Performing a matrix multiplication upon each pair of normalized X and Y coordinates, the matrix being in the form $$\begin{bmatrix} \cos\theta_1 & \sin\theta_1 \\ -\sin\theta_1 & \cos\theta_1 \end{bmatrix}$$

where $\theta_1$ represents the angle by which the image is to be rotated.

3. Denormalizing the coordinates of the rotated image elements obtained in step 2 by adding to the X coordinate of each rotated element the original X coordinate of the center of rotation and adding to the Y coordinate of each rotated element the original Y coordinate of the center of rotation.

4. Writing each unit of image data into the frame buffer at a location corresponding to its newly calculated X and Y coordinates.

In addition to the data handling operation mentioned in step 4, the computer would typically have to perform four multiplications and six additions or subtractions as to each of the possibly hundreds of thousands of pairs of picture element coordinates in order to perform the desired rotation of the image. Since the time required to perform a multiplication in most computers is greater than the time required for an addition or subtraction by one or more orders of magnitude, the number of image points which may thus be handled without causing the total time for the calculation to exceed one-thirtieth of a second (as required for picture animation) may be severely limited. Similar consideration apply to dilations of an input image.

For example, state-of-the-art computer graphics systems such as the Evans and Sutherland Picture System or the Vector General 3400 using hardware matrix multipliers can achieve this speed only if the number of pairs of coordinates to be operated on (i.e., the number of image elements) is limited to about 23,000. Natural pictures of good resolution, however, may contain over a million distinct image points.

It is an object of the present invention, therefore, to provide an apparatus for performing the operations necessary on digitalized representations of an image to cause the image to be rotated or dilated in the minimum possible time.

It is a further object of the invention to cause the total time necessary to perform such operations to be substantially independent of the number of image elements to be displayed.

It is another object of the invention to provide relatively simple apparatus for performing image rotation and scaling, for a wide variety of uses, including pattern recognition, image animations, and image display.

Certain principles and applications forming the present invention are set forth in a paper by the present inventors, entitled "Logarithmic Spiral Grids for Image processing and Display," dated June 15, 1977, a copy of which is included in the patented file. As described there, previous disadvantages and drawbacks of image-processing systems, particularly with respect to image rotation and scaling, may be obviated by initially regarding an image as being formed of a set of image elements (pixels) in the complex plane (x+iy) rather than in the more conventional Cartesian coordinate (x, y) system.

It has been discovered that a complex logarithmic transformation of the positions of image elements (regarded as points of the complex plane), by a conformal mapping into a Cartesian representation of the image from a plane whose coordinate lines are families of orthogonal logarithmic spirals, or a family of radial lines superimposed on a family of exponentially related circles or rings, permits a number of desirable image-processing operations to be performed simply and rapidly. For example, the operations associated with rotation or dilation of an image with respect to a point in the plane may be greatly simplified if the image is transformed into the complex logarithmic plane prior to the performance of the operations.

In particular, it has been discovered that upon rotation or dilation of the original image, the transformed image remains congruent; that is, the shape and size of the transformed image remains invariant despite such rotations and/or scaling of the original image.

A significant consequence of such a transformation is that for pattern recognition the number of operations or computations needed to be performed on the transformed image, either to determine the original image scale or rotational variations or to cause such variations, is simplified and can be made more rapidly.

For example, data representations of the individual transformed image elements or points may be separately stored in a storage array having the capability of shifting data in either or both of two perpendicular directions. Under these circumstances, magnification of the image corresponds to a relatively simple register shift in one direction, while rotation of the image corresponds to a similar register shift in a perpendicular direction. Matrix multiplication computations need not be performed to effect either scale or rotational changes and thus the hardware and time requirements for effecting these image manipulations are considerably reduced. Furthermore, this shift occurs simultaneously for all image elements rather than sequentially. In addition, since objects which are geometrically similar, but may vary in scale or rotational orientation, are mapped by the complex logarithmic transformation procedure into congruent image representations, template matching techniques are greatly facilitated, as is desirable for pattern recognition systems. As is shown below, these same principles and advantages are applicable to other image-processing applications.

These and other advantages and applications of the present invention will be apparent from the appended drawings, in which:

FIG. 1 is a schematic block diagram of a generalized image-processing system incorporating the present invention, as applied to pattern recognition;

FIG. 2A is a schematic diagram illustrating an image-sensing device in the form of an exponential ray/ring lattice or grid;

FIG. 2B is a schematic diagram illustrating an image-transformation device in the form of a rectangular (quadratic) lattice or grid;

Figure 3B:
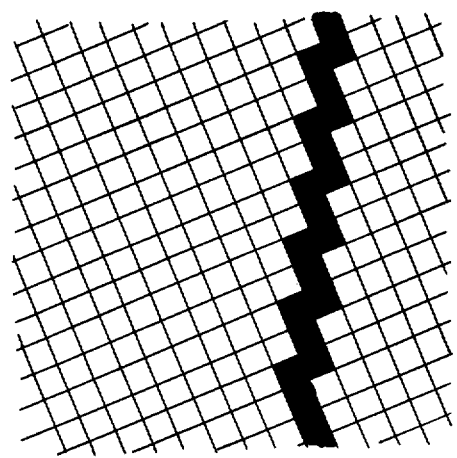
FIG. 3B is a schematic diagram ilustrating an image-transformation device in the form of a skewed lattice array for cooperation with FIG. 3A.

As indicated above, the present invention is adapted for for use in various image-processing systems, including pattern-recognition systems and image-modifying systems. Attention is first directed to pattern-recognition systems and certain principles common to various other uses of the present image-processing invention.

Pattern Recognition Systems

Referring now to the drawings, and in particular to FIG. 1, there is illustrated schematically a generalized image-processing system useful for pattern recognition which includes a standard lens system 10 for focusing an image I in a plane and an image sensing device 13 which is adapted to receive the image projected by the lens system 10 and to produce a set of image signals, each corresponding to a respective elemental area or picture cell ("pixel") of the image. Each image signal is characterized by a location (as in a particular coordinate system) and by a value or state (such as light intensity or color). In the present invention, the value or state is considered unchanged throughout a single pixel, while the location data are manipulated as described below for the purpose at hand.

The image data from sensing device 13 are supplied to an image transformation device 14, which converts the data to a different coordinate system. In effect, each picture cell is moved to a new location representative of the position of the picture cell in the new coordinate system. This is equivalent to the mathematical operation of mapping an image of one coordinate system into a different coordinate system.

The image so represented may then be manipulated in a simple way, by an image-adjusting device 15, to facilitate comparing it in a comparator 16 with a standard similar image or "template" 17 to permit obtaining information as to the scaling and rotation of the original image relative to the template, for use in a utilization device 18.

In its simplest form, the transformed image may be a visual one. Alternatively, it may be a set of digitized electronic signals representative of the set of image elements, which signals in the aggregate constitute the image or from which the image may be derived. Where the output from the image sensing device 13 is expressed optically, it is preferably subsequently converted to electrical signals through the use of a conventional video signal generating device 12, such as a conventional vidicon type camera pick-up tube, for advantageous utilization, as described in more detail below.

In accordance with a simplified form of the present invention, the image focused by the lens system 10 on the image sensing device 13 is digitized by the use of the image-sensing device depicted schematically in FIG. 2A, which consists of a plurality of conventional photosensors arranged in an illustrative geometric pattern. In this embodiment, the surface of the image sensing device 13 is an array 11 which is characterized by an imaginary grid or lattice pattern formed by a set of equi-angularly disposed radial lines a, b, c etc. and a set of concentric rings or circles 1, 2, 3 etc. spaced exponentially from the center; that is, the rings have successive radii of $e^{kx}$ where e is the base of natural logarithms (2.71828 ... ), x takes on successive values 0, 1, 2, 3 etc. representing the number designation of each ring, and k is a constant. This arrangement forms an orthogonal coordinate system with coordinates $\theta$, log $\rho$, where $\theta$ is the angle formed by a radial line with a preselected zero line (assured to extend rightward from the origin) and $\rho$ is the radius of a ring. This is one form of a logarithmal or exponential grid where each set of $\rho$ and $\theta$ uniquely defines an image point. A ring/ray grid can be set up with a given number of $\rho$-values and a given number of $\theta$-values, the number of such $\rho$-values and $\theta$-values being selected to provide a number of grid intersections corresponding to the number of picture elements desired. The result is that conventional Cartesian x-axis parallels correspond to radial or ray-like lines with respect to the center of the rings, the conventional Cartesian y-axis parallels correspond to the concentric rings, and the mutually congruent unit squares which characterize a conventional Cartesian rectilinear grid pattern correspond to curvilinear bounded picture cells which are mutually similar, each forming an elemental area of the image.

In its simplest form, such an image sensing device 13 may take the form shown in FIG. 2, of a suitable flat plate 11 provided with a plurality of holes 19, each hole representing one intersection point of the ray and ring coordinates defining the grid system pattern imposed on the plate. A suitable optical sensor may then be mounted at or behind each of the holes formed in the plate 11. For example, such optical sensors may take the form of fiber optic cable elements 20 or photocells, light-sensitive diodes or other light-responsive elements having localizable properties suitable for arranging in an array of this type and suitable for deriving a signal representing, for example, the image light intensity and/or color at its respective picture cell.

In accordance with one embodiment of the invention, useful in explaining its principles, the image sensors are the pick-up ends of respective optical fibers of a fiber-optic bundle 20, by which the optical output from the image-sensing device 13 is transmitted to the transformation device 14 of FIG. 1, where the original image becomes a transformed image, to be described. The transformation device 14 in this instance takes the form of a row-column two-dimensional structure having rows, a, b, c etc. and columns 1, 2, 3 etc. patterned after the usual Cartesian grid and provided with a plurality of light-responsive elements arranged in a rectangular (quadratic) lattice (FIG. 2B). Each of the light-sensitive elements is connected to a respective one of the optical sensors carried by the image-sensing plate 11. In the case where optical fiber is used as the connection, each light-responsive element is the respective output end of an optical fiber. Where other light-sensory devices or connecting elements are used, the respective light-responsive device is a conventional element suitable for producing a light output corresponding to the light intensity to which its respectively coupled light sensor is exposed.

As now shown, this arrangement results in a unique complex logarithmic transformation of the original input image to produce a transformed image which is rotation and scale (i.e. dilation) invariant.

Such a transformation can most readily be understood by considering a simple example where the input image is in the form of a square 24 centered on the light-sensitive logarithmic array of the plate 11 as shown in FIG. 2A. In the simplified version illustrated, this logarithmic grid may be considered to consist of a plurality of exponentially spaced concentric rings 1 through 5 and radially directed equiangularly diverging rays a through h. The corresponding rectangular transformation array of the transformation device 14 of FIG. 2B consists of columns 1 through 5 (which correspond respectively to the concentric rings of the logarithmic grid) and rows a through h (which correspond respectively to the rays of the logarithmic grid). As described above, image-transmitting apparatus such as the fiber optic cable 20 interconnects corresponding coordinate intersection points of the grids of the image sensing device 13 and the image transformation device 14. For example, the ray-ring intersection point (a, 4) of the logarithmic grid is connected by way of the fiber optic cable 20 to the corresponding coordinate intersection (a, 4) of the Cartesian array. Similarly, the corresponding points (a, 3) of the logarithmic and Cartesian grids are interconnected, and so on with each of the respective coordinate intersection points.

Considering now the projection on the array or grid 11 of the image sensing device 13 of an image of the square 24, it will be observed for this elementary example that the image may be approximated by image points (a,4), (b,3), (c, 4) and so on for each corner of the sqaure. When transferred to the rectilinear array of the image transformation device 14, this image is converted to what appears for this example as a curvilinear generally scallop-shaped line 26 having a plurality of cusps 26', each of which represents one of the four corners of the square. The coordinate points on the grid of the image transformation device 14 respresenting the cusps of the line 26 are aligned along ordinate column (4) corresponding to ring 4 on the logarithmic grid.

If now the size of the input image is decreased to the size of a smaller square 27 shown on the grid of the image sensing device 13 of FIG. 2A a new image 28 appears on the grid of the image transformation device 14. When the coordinates of the image points defined by the square 27 on the logarithmic grid 11 of the image sensing device 13 are correlated or mapped as described above onto the grid of the image transformation device 14 it will be observed that this new image is identical in size and shape (i.e., is "congruent") to the image 26. The difference in size or scale of the two input squares is represented only by the horizontal shift of the image 28 to the left on the rectilinear grid of the image transformation device 14. That is, the image cusps representing the four corners of the smaller square 27 are positioned along the ordinate column (2) corresponding to ring 2 of the logarithmic grid but the two transformed images are otherwise identical on the rectilinear grid of the image transformation device 14. If the original image 24 were to be magnified rather than made smaller, the resulting transformation image would correspond to the image 26 but would appear shifted to the right of image 26 in FIG. 2B. This means that the transformed image corresponding to the original input image is "scale invariant." Stated differently, any two original images which differ only in scale (i.e., size or magnification) will be transformed into new images on the grid of the image transformation device 14 which are of the same size, but spaced laterally.

The output image on the grid of the transformation device 14 is also rotationally invariant, as may be demonstrated by considering the original image to be rotated through a given angle to the position shown by the square 29 in broken lines in FIG. 2A. The four corners of the rotated image are now represented by image point coordinates (b,4), (d,4), (f,4) and (h,4) on the logarithmic grid. This rotated-square image becomes the transformed image represented by the broken line 31 on the rectilinear grid of the transformation device 14 of FIG. 2B. As was the case with the image 26, the cusps are aligned along the ordinate 2 but the image 31 is shifted downwardly from the original image. It is significant that despite the rotation of the original image, the transformed image 31 is identical in size and shape to the original image 26. Hence this transformation is also "rotation invariant".

It will thus be seen that by use of the ray/logarithmic ring image pick-up grid coupled to a Cartesian display or converter grid, the transformed image is invariant with respect to rotation and to dilation (magnification or shrinkage) of the original image. Such scale and rotational invariance enables relatively simple comparison techniques to be employed for purposes to be described below, for example in testing the resulting output image against a previously stored template image to which the output image for a given shape is always congruent. The mathematical principles underlying the foregoing image transformation characteristics of the present arrangement are set forth in our previously mentioned paper entitled *"Logarithmic Spiral Grids for Image Processing and Display"*. As is there pointed out, the property of rotational and scale invariance is present not only in transformation between the ray/ring grid and the Cartesian rectangular grid, but is also found for a curvilinear logarithmic spiral coordinate system, shown for example in FIGS. 3A and 4A.

In the example described above, the ray/ring grid of FIG. 2A is an exponentiated version of the quadratic lattice grid of FIG. 2B. While this ray/ring exponentiated version is a desirable geometric implementation for the image sensing device 13, other complex logarithmic coordinate system patterns may also be utilized for picture digitization. For example, the grid pattern defining the arrangement of light-responsive elements of transformation device 14 may have the X and Y grid parallels skewed as shown in FIG. 3B, in which case the counterpart exponentiated transformation lattice is formed of two orthogonally intersecting families of logarithmic spirals shown in FIG. 3A. The shaded areas show the digitized approximation of a straight line in each system; the approximation may be made as close as desired, as by reducing the sizes of the cells, thereby increasing resolution. It will be understood that corresponding cells of the two lattices are coupled as before.

Particularly, where close packing of a plurality of fiber-optic light-transmitting elements is desired, the grid geometry may take the form of an exponentiation of an equilateral triangular lattice. The image-sensing grid is then the two families of intersecting non-orthogonal log spirals of FIG. 4A, while the transformed image grid is the lattice of FIG. 4B. In such a pattern, any group of six adjacent and mutually similar generally triangular unit cells 23 may be viewed as defining a hexagon within which a plurality of optical fibers may be most efficiently packed together.

In still another alternate embodiment, the image-sensitive elements of the sensing device 13 may be patterned after the usual Cartesian grid rather than one of the exponentiated patterns described above. In that event, however, the transformation device 14 should consist of elements arranged in a logarithmic "horseshoe" pattern, such as that depicted in FIG. 10, described below, based upon the transformation equation Z=log(w). Other alternative techniques for inducing a complex logarithmic image transformation either optically or electronically will occur to those skilled in this art within the principles and scope of the present invention.

It will be seen that the apparatus of FIGS. 2A and 2B (or its variants as described herein) actually serves to associate a picture element or cell of Cartesian coordinates (p,q) with a particular light-sensor identified in the ray/ring coordinate system by a ring corresponding to p and a ray corresponding to 9. In effect, this is a digitizing and mapping of the Cartesian grid upon the ray/ring grid, and constitutes one form of Cartesian to log spiral converter. This mapping may be represented by a particular coordinate transformation equation. In this case the equation is $w=e^z$, where z is the complex number representation $(x+iy)$ of the Cartesian coordinates of the picture element, and w is the complex number representation of the coordinates of the transformed position in the picture cell in the ray/ring system, such that each ring radius equals $w=e^x$ and the angle of each ray is $$\theta = 2\pi Y/Y_{max}$$

Figure 3A:
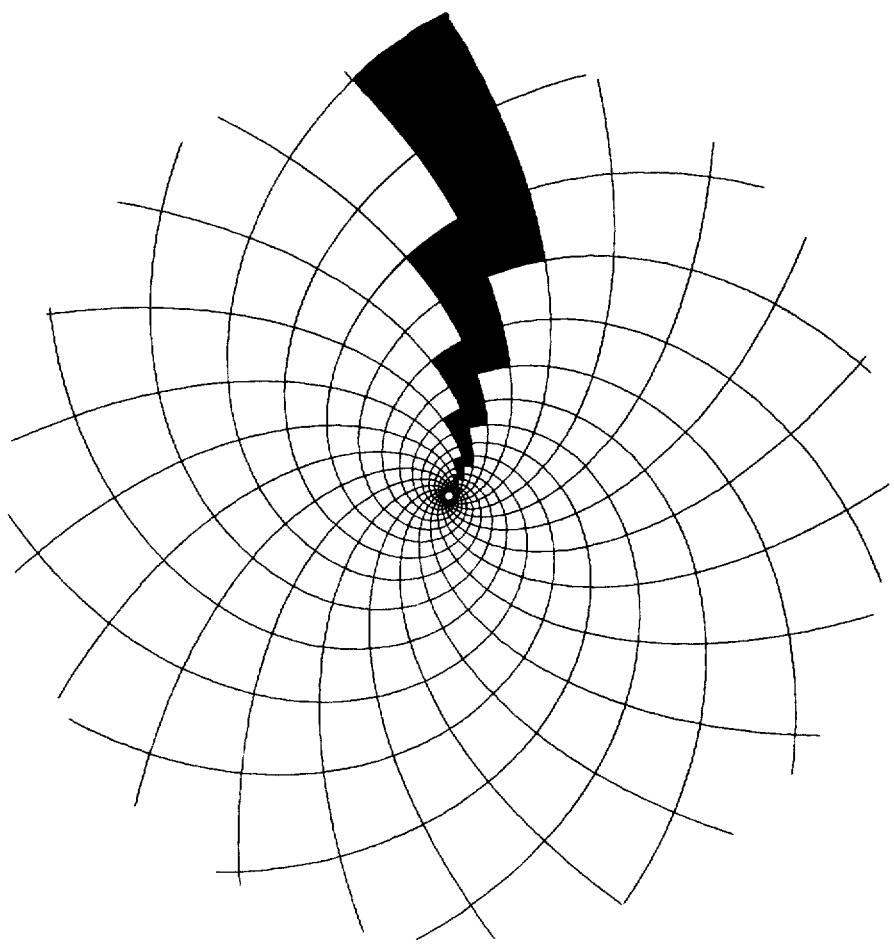
FIG. 3A is a schematic diagram illustrating another image-sensing array, alternative to FIG. 2A, and arranged in an orthogonal logarithmic spiral lattice or grid.
Figure 4B:
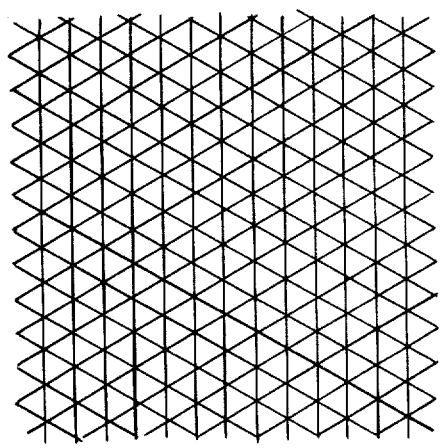
FIG. 4B is a schematic diagram illustrating an image-transformation device arranged in an equilateral triangular lattice for cooperation with FIG. 4A.
Figure 4A:
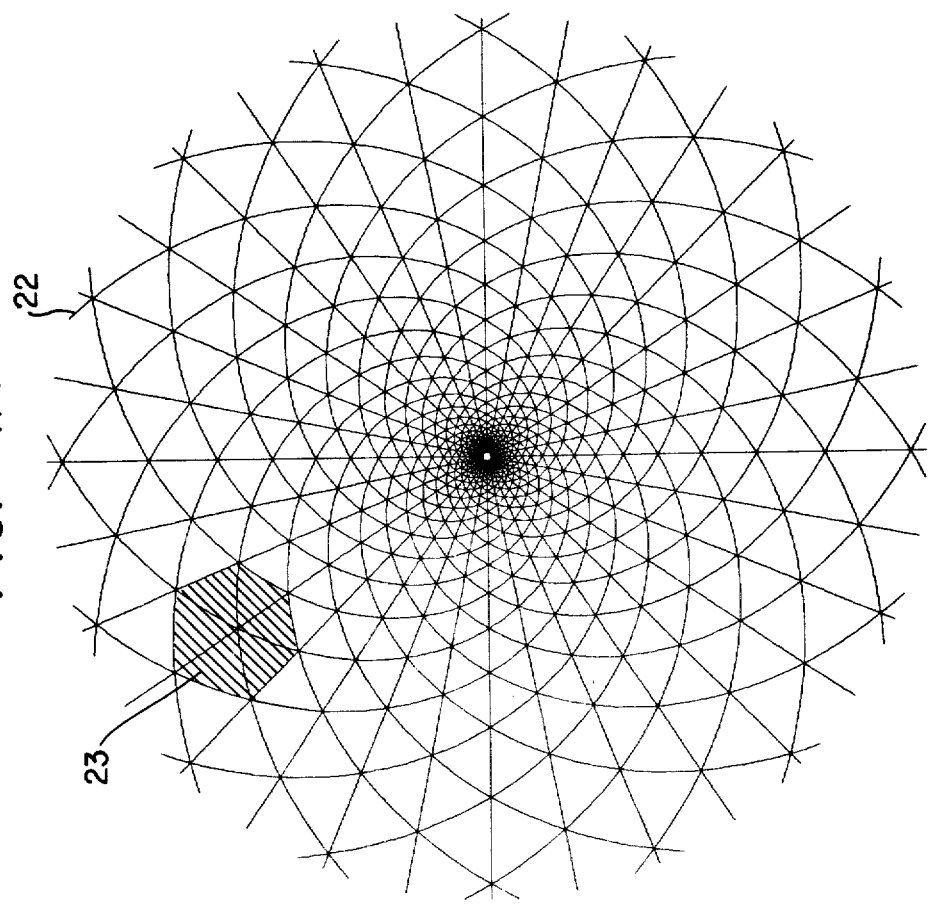
FIG. 4A is a schematic diagram illustrating a further image-sensing array alternative to FIGS. 2A and 3A, and arranged in an angularly related log spiral lattice or grid.

The arrangement of FIGS. 3A and 3B, and that of FIGS. 4A and 4B, are additional forms of Cartesian to log spiral converter. In each case an image defined in one coordinate system (an "image space") is converted to a corresponding image in another coordinate system (a "computation space") where desired manipulation (e.g. scaling and rotation) may be accomplished more simply. (A log-spiral-to-Cartesian converter is provided merely by interchanging each light sensor and its corresponding light-sensitive device.)

It will be understood that the projection of the image upon the array 13 of individual image-sensing devices is but one way of digitizing the image. Still another way is by scanning the image or scene by a conventional video camera tube, such as a vidicon tube, to produce a video signal corresponding to the image, and then digitizing the video signal in well-known manner to provide a series (or "list") of image cell coordinates (i.e., location data) with each of which is associated respective image-state data, such as light intensity value, color, depth, heighth or other individual picture cell data. It will also be understood that a digitized version of an image may be directly synthesized by known techniques, rather than sensed from an actual image.

Where fiber-optic techniques are used as described above, the transformed or output image from transformation device 14 is converted to electrical form by means of a video signal generator 12 shown in dotted lines in FIG. 1 to facilitate subsequent storage, as in a typical pattern recognition utilization system described in detail below. Where the original input device is focused on the fiber optic sensing array of the sensing device 13, such image conversion and storage may be achieved by having each of the optical fibers emanating from the exponential grid (e.g. FIG. 2A) terminate at a respective one of a plurality of light-sensing diodes (or other pick-up devices) arranged in the Cartesian array (e.g. FIG. 2B). It may be considered that each cell of array of the transformation device 14 represents such a diode. Each such diode may then in turn be uniquely connected to a respective one of a plurality of conventional storage element, such as a flip-flop element, such that the element assumes one state when its respective pick-up is Illuminated and the other state when that pick-up is not illuminated. With such an arrangement, a binary-valued transform of the input image is conveniently stored, as will be readily understood by those skilled in the art. Alternatively each pick-up could be used to measure color and intensity of light.

It will be understood that the present invention is not limited to the use of fiber-optic components for the image-sensing device 13 or transmitting means 20. As an alternative, each image-sensing element of the array 13 may consist of a light-sensitive pick-up diode placed directly in the array 13 at the appropriate position to sense the respective picture cell. Where it is desired to transmit an image having lighted and unlighted picture cells, each pick-up diode of the array is then associated electronically with a respective one of a plurality of binary bit storage devices, such as a conventional flip-flop circuit. In such an arrangement the resulting non-geometric electronic assemblage containing the flip-flop circuits may be regarded as the transformation device 14 where each flip-flop corresponds to a coordinate set or elemental area of the Cartesian grid. The details of the logic circuitry for such an electronic array will be understood from the description below in connection with a unique shift register construction adaptable both for pattern recognition and for pattern manipulation and display techniques.

Alternatively, the image-sensing device 13 may consist of an array of charge-collecting elements of a conventional charge-coupled imaging device, with one such element for each predetermined picture cell of the image. Output from the charge-coupled device may be transmitted to an electronic data storage array, such as the two-dimensional storage register described below.

Similarly, a conventional vidicon camera tube may be employed as the image-sensing device 13. In this case, where the ray/ring arrangement is desired, its electron beam is preferably controlled by suitable circuits to scan along successive angularly-incremented radial lines from an origin, to cover a circular raster, with the scan along any one radial being at an exponentially increasing rate as function of distance from the center or origin. Alternatively, the electron beam may be scanned in a logarithmic spiral curve to cover the raster.

In this way image sampling is achieved for predetermined image points electrically represented on the vidicon screen as though in a ring/ray pattern. The video signal output from the camera tube is then similarly transmitted to a suitable electronic storage and transformation apparatus, described below.

Figure 5:
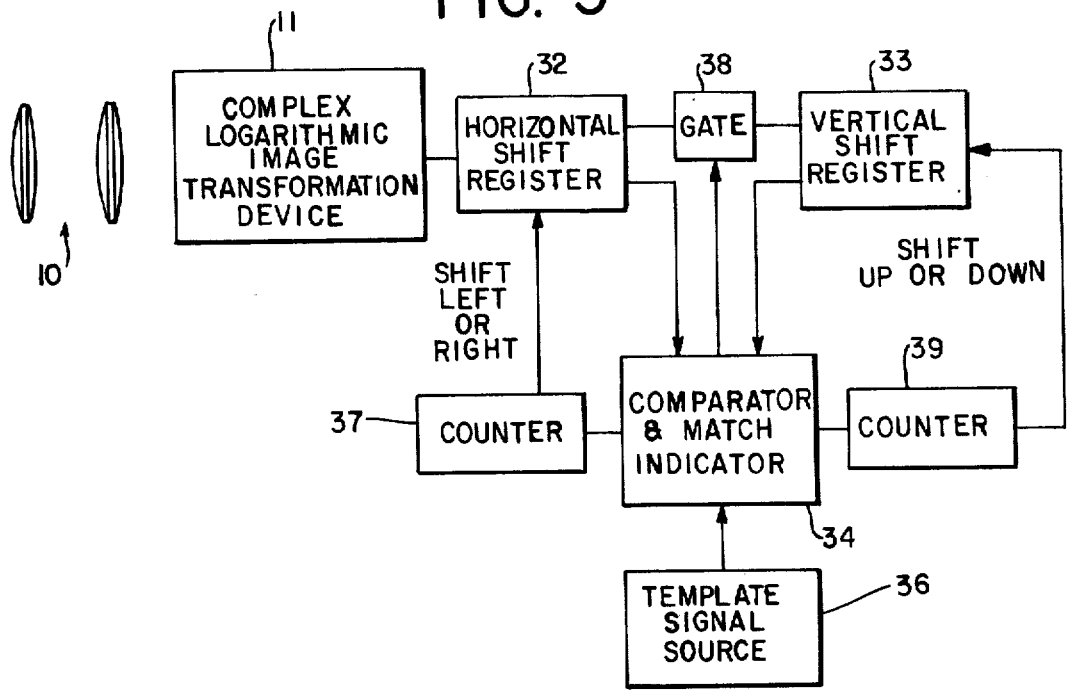
FIG. 5 is a schematic block diagram of a form of pattern-recognition system.

FIG. 5 illustrates schematically a system using one technique for obtaining useful information from a rotation-invariant and scale-invariant image transformation as described above. In this system the outputs from the image transformation device 14 are converted in any desired way to data signals having location data and picture-cell value data, as described above. Thus electrical data signals are obtained, corresponding to the transformed image described above. These signals are then supplied to a conventional shift register 32 adapted for the horizontal shifting of the stored signals. Such a shift register may be one component of a special-purpose digital computer apparatus which may also include in essence a second shift register 33 for vertical shift, a conventional comparator 34 and a template signal source 36.

The template signal source 36 is adapted to provide a set of signals representing the transformed image to be recognized. For purposes of illustration, the memory device may store signals representing the cusped image 26 of FIG. 2B, corresponding to an original square image. Such stored signals merely represent the light-/dark values of the respective grid intersections of the Cartesian grid of the image transformation device 14, when the cusped image is superposed thereon. If a square image is initially sensed by the system, it will produce at the output of the image transformation device 14 a set of pattern signals representing a logarithmically transformed version of the input image, which signals are supplied to the horizontal shift register 32. The comparator 34 is of conventional type, adapted to compare for image congruence the logarithmically transformed input image contained in the horizontal shift register 32 with the previously stored template image provided by the template source 36, despite scale and rotational differences. As indicated above in connection with FIGS. 2A and 2B, scale and rotational differences between the input image and the image represented by the template will appear in the output signal from the transformation device 14 as positional shifts of the transformed image left or right or up or down, respectively, within the rectangular grid coordinate system of FIG. 2B. A comparison may be made then by merely recording the number of shifts required to be made in the horizontal shift register until the two images overlap. For example, if the scale of the input image is smaller than that of the template image (squares 24 and 27, FIG. 2A) the former will, in effect appear to the comparator 34 as shifted to the left of the template image. A series of incremental shifts in the horizontal shift register is therefore initiated and continues until the comparator is satisfied, for example, that the aforementioned cusps are aligned along the same predetermined fixed reference line, such as the ordinate column (2) of the transformation array 14. Each time a shift is made, a conventional shift counter 37 records the change, thereby deriving a count figure representative of the differences in scale between the input and template images. Once the comparator 32 is satisfied that a horizontal match has been achieved between the images, a conventional gating element 38 is actuated to transfer the contents of the horizontal shift register 32 to the shift register 33 also of conventional type, for vertical shifts.

As described with reference to FIG. 2B, if the input image and the template image are out of angular alignment (e.g., squares 24 and 29) this difference will appear to the comparator 32 as a vertical shift up or down of one image with respect to the other. Accordingly, a series of vertical shifts is initiated by the comparator within the vertical shift register 33 until the comparator is satisfied, for example, that the image cusps are aligned respectively along the same abscissa of the transformation grid. Each time a vertical shift is made a suitable conventional vertical shift counter 39 records the shift, so that a sum total of the number of shifts required to establish the vertical match is determined. The counter 39 therefore contains information indicative of the rotational orientation differences between the input and template images. It is this recorded information as to the scale and rotational differences between the two images being compared, as represented by the contents respectively of the counters 37 and 39, which constitutes a useful output from the present image processing system, and may be used for additional purposes to be described below.

The horizontal shift register 32 and vertical shift register 33 may be replaced by a two-dimensional storage or shift register capable of shifting independently along either of the two dimensions as described below with reference to FIGS. 8 and 9. Such an electronic array may advantageously be formed as an integral part of the image transformation device 14, especially in those embodiments of the present invention referred to above and described in detail below in which image transformation occurs along electronic as opposed to optical paths.

Figure 5A:
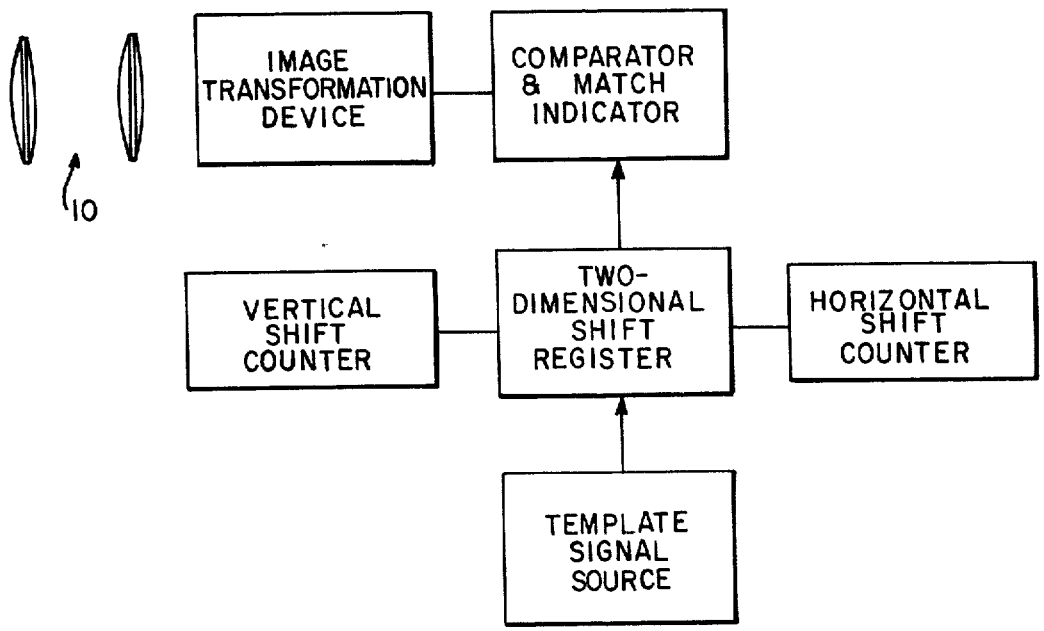
FIG. 5A is a block diagram of a pattern recognition system similar to that of FIG. 5 which emboides a horizontal and a vertical shift register as a single component.

As a further alternative, horizontal and vertical shift registers 32, 33 may be omitted, and instead a controllable two-dimensional shift register may be interposed between the template signal source 36 and the comparator 34. This arrangement is illustrated in FIG. 5A, whose functioning will be apparent from the description of FIG. 5. In both instances, the template "image" and the input image are matched vertically and horizontally, and the increments needed for match are indicative of their scale and rotational relationships.

The image-processing techniques of the present invention find particular utility in a system for automatically tracking and manipulating moving objects. For example, the present system may be used for the purpose of guiding or directing a mechanism to grasp objects such as randomly sized boxes being carried in random orientation on a conveyor belt or the like.

Figure 6:
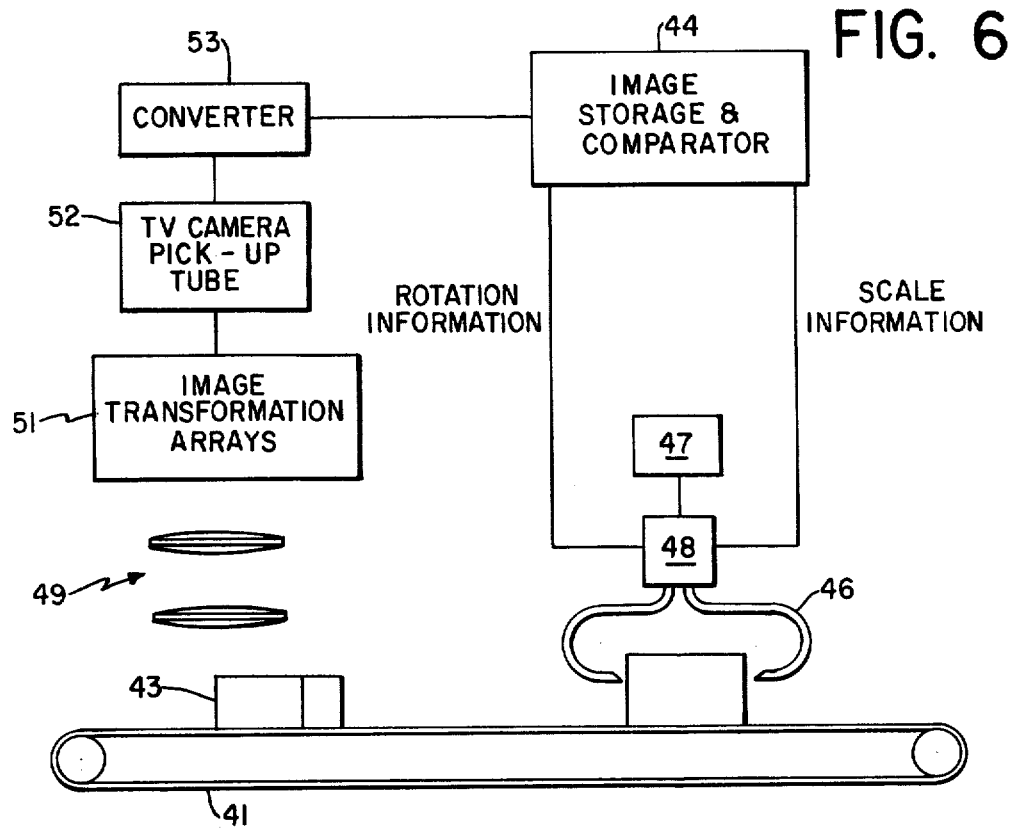
FIG. 6 is a schematic block diagram of a material-handling system using pattern recognition techniques.

Such a system is illustrated schematically in FIG. 6 and preferably includes a step-wise or continuously moving conveyor such as an endless belt 41 and a television camera and camera carriage assembly 42 situated above the belt and oriented for viewing objects such as randomly positioned boxes 43 carried along by the belt. The video output from the television camera is connected to an image storage and comparison apparatus 44 of the present invention. The output of the apparatus 44 controls an object-grasping device illustratively in the form of a pair of pincers or tongs 46 suspended adjacent the conveyor belt and movable back and forth relative thereto for gripping and manipulating the boxes. Movement of the tongs 46 to a central gripping position over the moving belt and boxes is controlled by a suitable electric motor and servo mechanism 47. The tongs are also adapted for movement toward and away from the boxes and preferably open and close automatically under the control of a local motorized drive mechanism 48. Rotational movement of the tongs about their major axis may also be controlled by the drive mechanism 48. In some cases the drive mechanism 48 may, in addition, permit the tongs to be tilted away from the vertical so that adjustments may be made for gripping boxes that are not sitting flat on the conveyor belt.

In the present embodiment, the television camera and carriage assembly 42 includes a standard lens system 49 for focusing the image of a box situated on the conveyor onto a complex logarithmic image transformation device 51 as described above. Where the transformed image output from the transformation device is optical, the resulting output image may be focused onto the image screen of a standard vidicon type television camera tube 52. The vidicon pick-up tube converts the transformed optical output image from the transformation device 51 into a standard video output signal which is transmitted over cables to a converter 53 adapted to digitize in a known way the signals representing the individual elements of the television pick-up raster. The digital output from the converter 53 is then fed to the image storage and comparison mechanism 44 as described with respect to FIG. 6.

This image storage and comparison mechanism contains a previously stored digitized template image which represents a reference size and orientation for a box situated in a predetermined way to be grasped by the tongs 46. It represents a convenient starting point for proper orientation of the tongs with reference to the randomly oriented and differently sized boxes carried on the conveyor.

The comparison mechanism 44 computes, in the manner described above, the incremental scale and rotational differences between a box carried by the conveyor as represented by the video input image, and the previously stored template image. Where the boxes are carried flat on the conveyor and the camera is directly overhead, as shown, the input image will be a two-dimensional shape representative of the box. As described above, the scale and rotational differences between the box images and the template image are represented by incremental counts contained for example in each of a pair of count registers 37, 39 (FIG. 5) recording the number of left-right (scale) and up-down (rotational) shifts required to obtain a match. The count registers 37, 39 therefore contain information which is used to instruct or to control movement of the tongs automatically to the proper positions and orientation to pick up a box from the conveyor. For example, the number of counts representing shifts required to obtain a match as to scale may be used to instruct the motor mechanism 48 to open or to close to the tongs to the degree required to match the size of the box to be picked up. Similarly, the number of counts representing shifts required to obtain a rotational match of the input and template images may be used to instruct the motor drive mechanism 48 to turn the tongs on their major axis to orient them so as to be able to straddle the box to be picked up. The techniques for converting the count registrations to a form of information suitable for use in instructing or controlling the drive mechanism 48 will be apparent to those skilled in the art and need not be described herein in detail.

Once the tongs are properly oriented and positioned, and closed to grip the box, conventional mechanism is used to lift the box, and place it on a pallet or in a carton for proper packing.

In addition to their applications in pattern recognition, the present invention is useful in modifying images, as in computer graphics, or image animation suitable for motion pictures or television.

Image Modifying Systems

In accordance with an illustrative embodiment of the present invention for use in image-modifying, digitized data representing an image to be processed before displaying is loaded into a frame buffer, preferably comprising a two-dimensional shift register of novel design. This shift register comprises a plurality of storage elements which are arranged in rows and columns corresponding to the rows and columns of elemental areas of the display screen. Means are provided in the shift register, responsive to signals generated by conventional means, for simultaneously shifting the data contained in all of the storage elements a preselected number of columns to the left or right or a preselected number of rows upward or downward.

This shifting of data in the frame buffer results in a corresponding repositioning of the image which will eventually be displayed, which as previously discussed, corresponds to the pattern of data stored in the frame buffer. Where it is desired to rotate or change the scale of the displayed image, the normalization and denormalization operations discussed above may be accomplished in a parallel and very rapid manner by simply shifting all of the data contained in the frame buffer by an appropriate number of rows or columns.

If a rotation or dilation of the image is desired, after the normalization operation is completed the data stored in each storage element of the frame buffer is transferred to a corresponding storage element of another two-dimensional shift register by converter means which will be described below. This second two-dimensional shift register is arranged in one form so that its rows and columns of storage elements correspond respectively to orthogonals representing (a) angles ($\theta$) about a center point or origin, and (b) the logarithm of distance from the origin (log $\rho$) in a complex logarithmic coordinate grid.

It is a feature of the present invention that shifting data upward or downward in such a register corresponds to rotation of the original (cartesian-plane) image as displayed on the display screen. Similarly, shifting the data in the register to the left or to the right corresponds to the expansion or contraction (dilation) of the displayed image. Furthermore, since all of the data in the register is shifted by the same amount, and this shifting may occur simultaneously, the time required to complete the operation may be substantially independent of the number of storage elements in the register or the number of image points to be displayed.

After the shifting operations in the second two-dimensional shift register are completed, the data contained in each storage element of the register is transferred back to the corresponding storage element of the frame buffer. Here the data is again shifted to accomplish the denormalization operation as described above. After denormalization the data contained in the frame buffer may be utilized in known manner by a conventional display controller to cause a display device (also of conventional design) to display the appropriately rotated or dilated image.

The foregoing general statement of this facet of the invention will become clearer from the following more detailed description.

As previously mentioned, digitized data representing an image to be displayed is commonly stored by a computer in a frame buffer which is organized to correspond to an X-Y or cartesian grid which may be thought of as being superposed on the screen of the display device and thereby on the displayed image. This frame buffer may be regarded as a cartesian grid of unit squares in the complex Z-plane. A complex exponential image of this plane may be obtained by mapping the Z-plane into a W-plane by the formula $W = e^Z$. In the W-plane, a logarithmic spiral coordinate system or grid is selected such that each point may be identified by an angle $\theta$ from a reference direction and by the logarithm of the displacement P of the point from the origin (log ρ).

As a feature of the present invention, a two-dimensional shift register is provided such that each storage element of the shift register uniquely corresponds to a point in the logarithmic spiral grid. The data store in each such element then represents the state of the image cell at that point (e.g., light or dark, or gray value, or color, etc.). Such storage is accomplished in any of the ways discussed above, this storage register corresponding to the image transformation device 14 of preceding figures. The stored data then represents the transformed image data discussed above.

As pointed out above, an image superposed on a logarithmic spiral or logarithmic ray/circle grid may be in effect rotated merely by laterally shifting its transformed images in one direction, and may be in effect dilated by laterally shifting the transformed image in an orthogonal direction.

As a consequence of this arrangement, a rotation of the image whose transformed counterpart is represented by the data stored in the storage elements of the shift register, may be accomplished by simply shifting all of the data contained in the shift register an appropriate number of positions up or down. Similarly, dilation of the image may be accomplished by shifting the data contained in the shift register in appropriate number of positions to the right or to the left.

Figure 7:
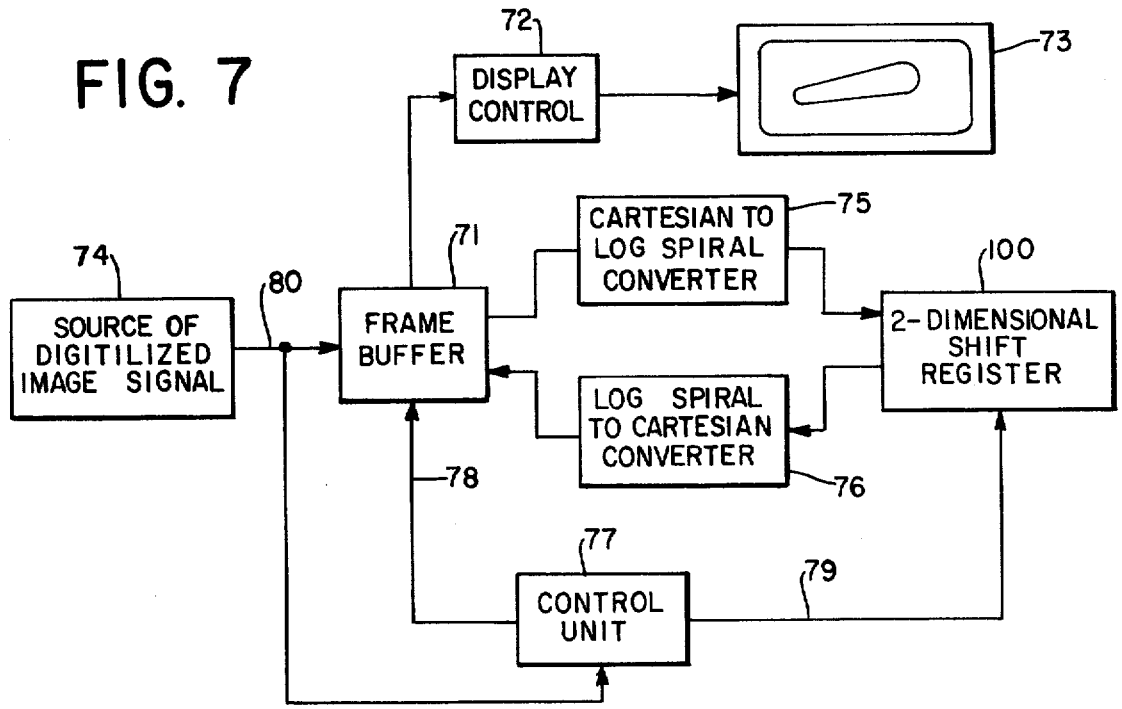
FIG. 7 is a schematic block diagram of an image-modifying system.

Referring to FIG. 7, there is shown in block form a system for performing rotations or dilations of images to be displayed upon a display device 73 (e.g., a TV monitor screen) in accordance with an embodiment of the present invention. The system includes a frame buffer 71 which is operatively connected to a conventional computer 74 or other source of digitized image signals. Frame buffer 71 may be a random access memory which includes a plurality of memory elements arranged or ordered according to a cartesian array, such that each memory element may contain data representing, for example, the light intensity, color, or apparent depth of image to be displayed at a uniquely corresponding point on the display screen of display device 73. In a preferred embodiment of the system depicted by FIG. 7, however, frame buffer 71 comprises a two-dimensional shift register of the present invention which will be described below. Frame buffer 71 is also connected to a cartesian-to-log spiral converter 75 (to be described below) which in turn is connected to a two-dimensional shift register 100 of the present invention. The cartesian-to-log-spiral converter 75 serves to transform each point of the cartesian grid to its respective counterpart in the log-spiral or logarithmic ray/ring grid. The output of shift register 100 is connected to a log-spiral-to-cartesian converter 76 which in turn feeds frame buffer 71. Frame buffer 71 is also connected to a display controller 72, which may comprise any conventional controller which is adapted to convert digital data into a format suitable for operating the conventional display device 73, as is well known in the art.

The illustrative system depicted in FIG. 7 operates as follows. Computer 74 writes or provides data, which defines the image to be displayed, into the appropriate storage elements of frame buffer 71 by conventional means, over a connection 80.

If the image represented by the data written into frame buffer 71 is to be moved in an X or Y direction on the cartesian grid corresponding to the display screen of display device 73, computer 74 sends data defining the parameters of the move to control unit 77 via connection 80. Control unit 77 responds to this data by activating signal path 78. The activation of this signal path, in turn, causes the data stored in frame buffer 71 to be shifted in the specified direction by the instructed number of columns and rows.

If the image represented by the data in frame buffer 71 is to be rotated or dilated, the necessary normalization function may be accomplished by the means described above. In this case, the computer 74 calculates the direction and magnitude of the shift of data needed to accomplish the normalization and sends data representing the parameters to control unit 77 via connection 80.

Shifting operations within frame buffer 71 and two-dimensional shift register 100 are controlled by a control unit 77 of conventional design. Control unit 77 is adapted to receive data defining the operations to be performed on the image from the computer 74 via connection 80. Control unit 77 acts responsively to this operation-defining data for activating the appropriate one of signal path 78 which controls the operation of frame buffer 71 or signal path 79 which controls the operation of two-dimensional shift register 100.

After normalization, the data contained in each storage element of frame buffer 71 is set into a corresponding storage element of shift register 100 by the Cartesian-to-log-spiral converter 75.

Cartesian-to-log-spiral converter 75 may take several forms. In its simplest form however, it may merely be a plurality of electrical signal paths, each path connecting a particular storage element of frame buffer 71 representing a particular point in a Cartesian grid to the corresponding storage element of shift register 100 which represents the complex logarithmic transform of that point.

After the data has been placed into shift register 100 it is shifted the appropriate number of positions up or down and left or right which represents the desired rotation and dilation of the displayed image. The data is then passed through log-spiral-to-Cartesian converter 76 (which may be constructed similarly to Cartesian-to-log-spiral converter 75) and set back into the corresponding storage elements of frame buffer 71. The data in frame buffer 71 is then moved to denormalized positions within that buffer by means similar to those above-described for the performance of the normalization operation. At this time, display control 72 may access the data within frame buffer 71 and activate display unit 73 to display the rotated and/or dilated image.

It will be appreciated that the above described system is merely illustrative and that many other embodiments are possible without departing from the scope of the invention. For example, if the digitized image data were originally in log-spiral rather than Cartesian form, converters 75 and 76 could be eliminated. In this case, frame buffer 71 could be formed by the two-dimensional shift register described below, and rotations or dilations of the image could be performed directly in it. In this case, however, it would be necessary to place a log-spiral-to-Cartesian converter between the frame buffer 71 and the display controller 72. This latter converter could also be eliminated if display controller 72 in combination with display unit 73 were designed to operate directly on data presented to them in log-spiral form.

The Two-Dimensional Shift Register

As will be appreciated from the above discussion, a key element of the embodiment presently described is a novel two-dimensional shift register which may serve as the two-dimensional shift register 100 of FIG. 7 for logarithmic spiral signals. Generally, such a shift register includes a plurality of storage elements arranged in N columns and M rows, each column containing M storage elements and each row containing N storage elements. The register is adapted to be responsive to a SHIFT RIGHT A signal or a SHIFT LEFT A signal to transfer the data contained in each given storage element to another storage element in the same row, and A columns to the left or right respectively of the original storage element. The register is also adapted to be responsive to a SHIFT UP B signal or SHIFT DOWN B signal for transferring the data contained in each given storage element to another storage element which is respectively B columns up or down from the original storage element. Such control signals may be manually set in, or automatically generated in response to preset conditions or computer program control.

Figure 8:
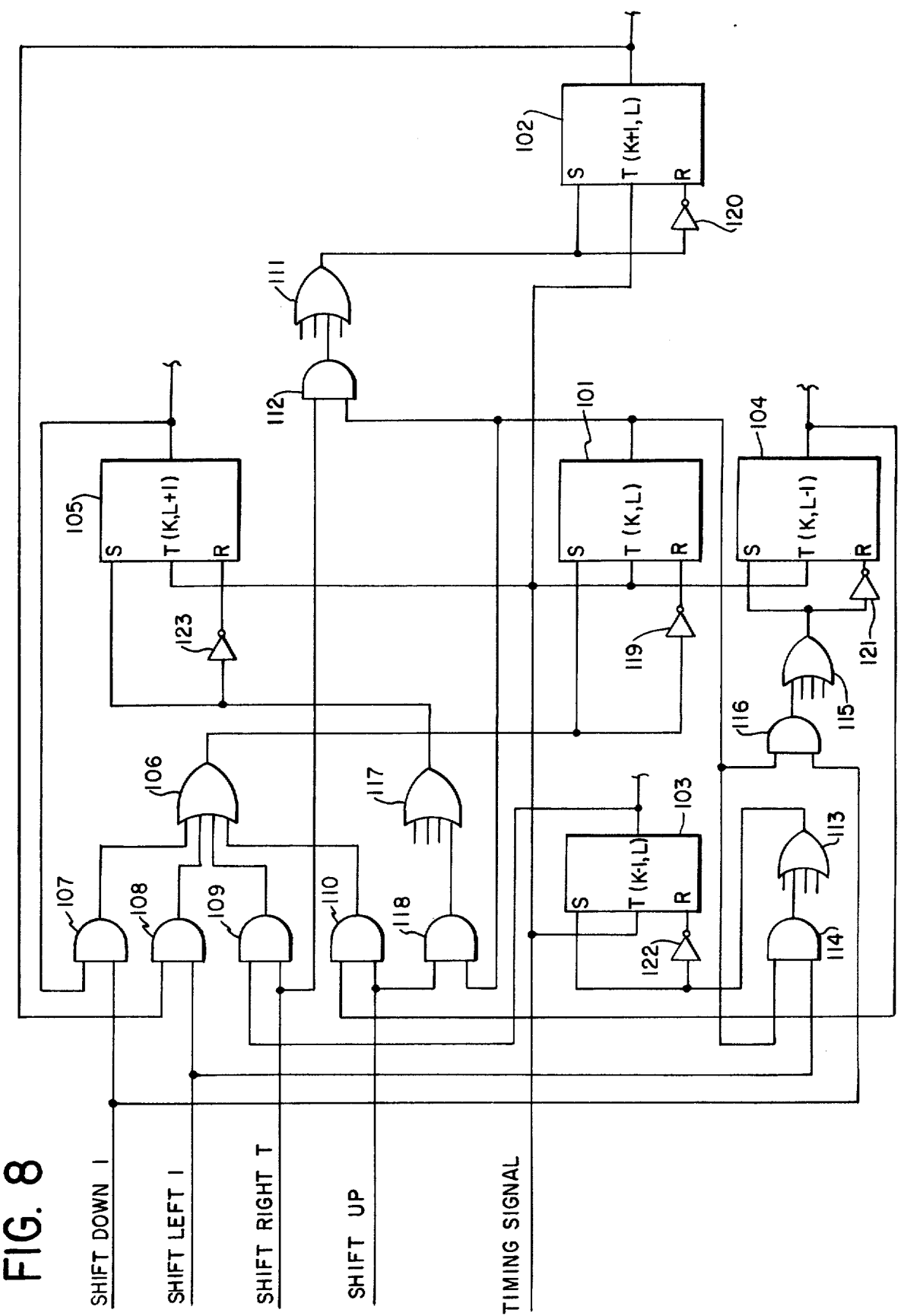
FIG. 8 is a schematic diagram of an iterative portion of a two-dimensional shift register according to the invention.

Referring now to FIG. 8, there is shown a typical interior portion of an illustrative embodiment of such a shift register. The illustrated portion includes a storage element 101 which is positioned in a representative column K and a representative row L of the register: column K being a column of storage elements situated at an intermediate position between the first and last columns of the register and row L being a row of storage elements situated at an intermediate position between the first and last rows of the register. Also illustrated are storage elements 102, 103, 104 and 105 which adjoin storage element 101 in the register; namely, storage element 102 is positioned at column K+1 and row L or one position to the right of storage element 101; storage element 103 is positioned at column K−1 and row L or one position to the left of storage element 101; storage element 104 is positioned in column K and row L−1 or one position down from storage element 101; and storage element 105 is positioned in column K and row L+1 or one position up from storage element 101. In the illustrative embodiment depicted by FIG. 8, each storage element comprises a conventional flip-flop circuit capable of storing one bit of binary data. It will be appreciated, however, by one skilled in the art, that other embodiments of these storage elements, which may be capable of storing more than one bit of binary data or any other appropriate data representation, may be employed without departing from the scope of the invention.

The illustrative embodiment of the shift register depicted by FIG. 8 is capable of responding to four distinct shift signals which may be generated by any conventional control unit such as control unit 77 of FIG. 7. These shift signals are a SHIFT LEFT 1, a SHIFT RIGHT 1, a SHIFT DOWN 1, and a SHIFT UP 1. Other embodiments capable of shifting data by more than one position would, however, be apparent to one skilled in the art.

As an example of the operation of the illustrative embodiment of FIG. 8 it will be assumed that it is desired to shift the data in all of the storage elements included in each column of the shift register one column to the right. The operation of the entire register may be described by focusing on the operations related to storage element 101. The shifting operation is initiated by the activation of the SHIFT RIGHT 1 signal. This signal is combined with the output signal from storage element 101 by AND circuit 112 and the resulting output signal of AND circuit 112 is presented to OR circuit 111. For example, if storage element 101 originally contained a logical "1", its output would be at an active level, and an active signal would consequently be presented by AND circuit 112 to OR circuit 111. Conversely, if storage element 101 originally contained a logical "0", its output would be at an inactive level and this inactive signal would be presented to OR circuit 111 by AND circuit 112. If the output of OR circuit 111 is in an active state, the "set" terminal of storage element 102 is conditioned. On the other hand, if the output signal of OR circuit 111 is in an inactive state the "reset" terminal of storage element 102 is conditioned by reason of the action of inverter 120. Upon the subsequent activation of a conventional timing signal, therefore, storage element 102 is appropriately set or reset so that the data contained in its is the same as that which was originally contained in storage element 101.

The SHIFT RIGHT 1 signal is also combined with the output of storage element 103 by AND circuit 109 and the resulting output of AND circuit 109 is passed to the set and reset terminals of storage element 101 by OR circuit 106. Thus, in a manner similar to that described above for the transfer of data from storage element 101 to storage element 102, the data originally contained in storage element 103 is transferred to storage element 101 upon the activation of the timing signal. Likewise, the operations of shifting data up or down in the shift register responsive respectively to the activation of the SHIFT UP 1 or SHIFT DOWN 1 signals is accomplished in a manner similar to that above described for the shifting of data to the left or to the right, as will be apparent from an examination of FIG. 8.

Figure 9:
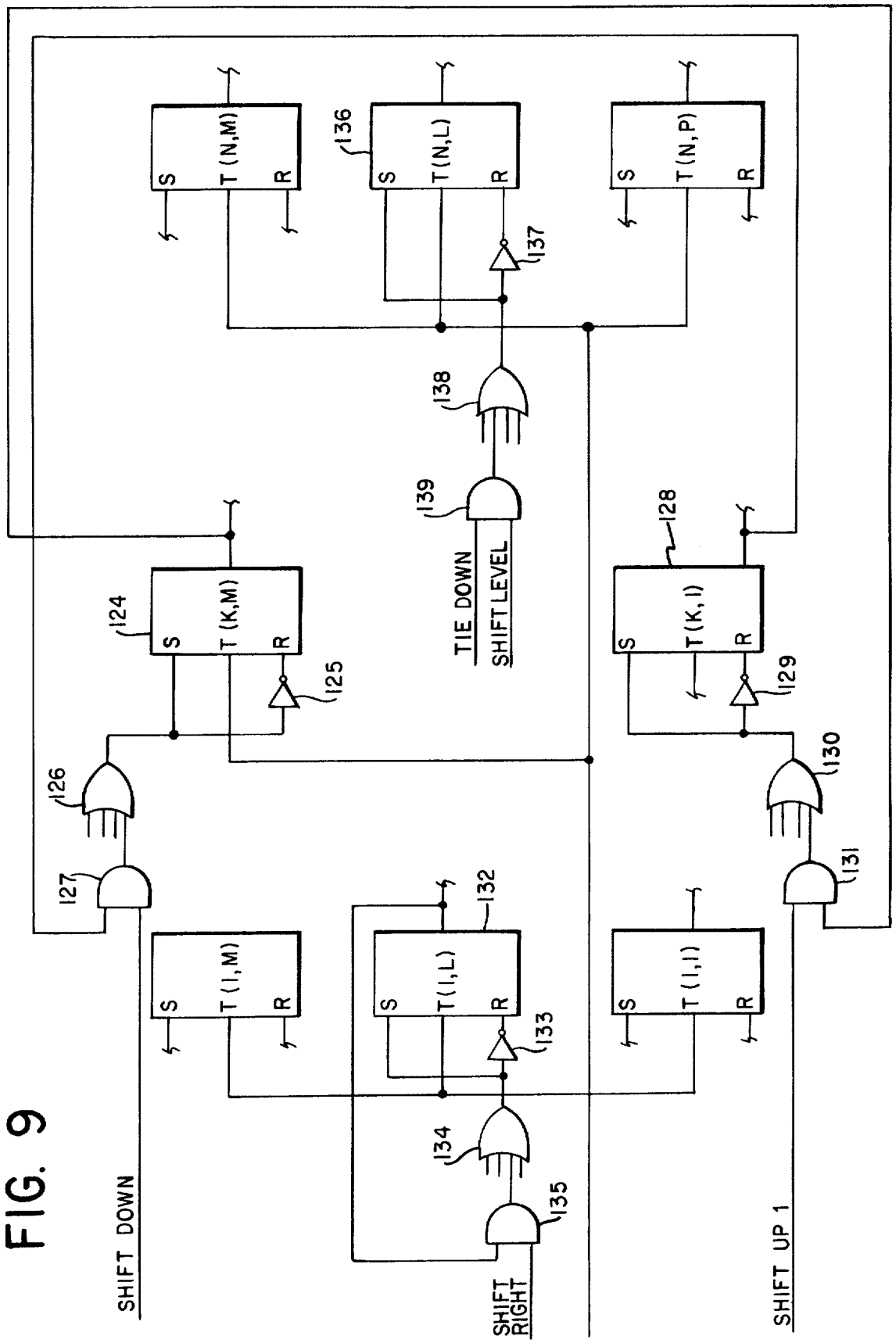
FIG. 9 is a schematic diagram of another portion of the shift register of FIG. 8.

Referring now to FIG. 9, there is shown some further detail of circuitry associated with the first and last columns and rows of a two-dimensional shift register, such as the one described above, which is adapted to store and operate on digitized data representing a picture or image laid out in a complex logarithmic grid system such as the one illustrated in FIG. 2A. In such an embodiment, each column of the shift register would represent an orthogonal for a constant value of the logarithm of displacement from the origin (log ρ) of the grid of FIG. 2A. Each row of the shift register would represent the orthogonal for a corresponding constant value of $\theta$ on the grid of FIG. 2A.

It will be noted that in the illustration of FIG. 2A the orthogonals representing constant values of log ρ are circular. The shift register which is partially illustrated by FIG. 9 is adapted to conform to the geometry of FIG. 2A in the following manner. The output of each storage element of the first row (row 1) of the shift register is routed so that upon the activation of a "SHIFT DOWN" signal the data which orginally was stored in that element will be moved to a storage element in the same column of the shift register and in a row determined by the number positions shifted. By way of example, FIG. 9 illustrates the circuitry necessary to perform this movement of data in a shift register adapted to shift data one row or one column at a time.

As illustrated by FIG. 9, a storage element 128 is positioned at row 1 and a representative column K of the shift register. Upon the activation of a SHIFT DOWN 1 signal, the output of storage element 128 is gated through AND gate 127 and OR gate 126 so as to set the data originally contained in storage element 128 into storage element 124 upon the activation of the timing signal. Contemporaneously to this operation, the data which was contained in the storage element at row 2 and column K of the register would be set into storage element 128. In a shift register with M rows such as the one illustrated in FIG. 9, it will be apparent that the performance of M one-position shifts downward will result in the data in each column of storage elements of the shift register being returned to their original storage elements.

As further illustrated by FIG. 9, the connection of the output of data storage element 124 to gate 131 facilitates an operation similar to the one described above in the case of the activation of the SHIFT UP 1 signal. Here the activation of the SHIFT UP 1 signal gates the data originally contained in storage element 124 to AND circuit 131 and OR circuit 130 so as to set this data into storage element 128 upon the activation of the TIMING SIGNAL.

The circuitry described is readily adapted to shift registers capable of performing shifts of more than one position at a time. For example, if the register of FIG. 9 were adapted to perform an operation of shifting down two rows, the data in storage element 124 would be set into the storage element positioned at row 2 and column K rather than into storage element 128.

Comparing FIGS. 8 and 9 to FIG. 2A, it will be noted that each row of the shift register may be correlated to a ray-like orthogonal of FIG. 2A which represents a particular constant value of $\theta$ and that each column of the shift register may be correlated to a circular orthogonal of FIG. 2A which represents a particular value of $\rho$. Each storage element of the shift register corresponds, then, to a respective point of intersection of the two sets of orthogonals of FIG. 2A. It will be further appreciated that shifting data up or down in the register of FIGS. 8 and 9 is equivalent to shifting image points along the corresponding constant $\rho$ orthogonals of FIG. 1.

The register of FIG. 9 is further adapted for simulating the movement of image points on the grid of FIG. 2A by providing the register with a "sign-fill" and a "zero-fill" facility. The "sign-fill" facility is provided for each storage element of column 1 of the shift register, and is activated by the SHIFT RIGHT signal. The "zero-fill" facility is provided for the last column (column N) of the shift register and is activated by the SHIFT LEFT signal.

As an example of this sign-fill facility, it will be noted from FIG. 9 that the output of storage element 132 of column 1 is connected to the input of AND gate 135. When the SHIFT RIGHT 1 signal is activated, therefore, the data which was originally stored in storage element 132 is gated back into it through AND gate 135 and OR gate 134. To understand the significance of this sign fill operation, it will be helpful to use an example in which before any shifting is done, a logical "1" is stored in storage element 132 and logical zeros are stored in all of the other storage elements of row L. This configuration of data in the shift register of FIG. 9 may be viewed as a single point at the intersection of the circle corresponding to column 1 and the ray corresponding to row L on FIG. 1. Successive shifts of data to the right in the register would result in the storage elements to the right of storage element 132 in the register having logical "1's" stored in them until all of the storage elements of row L of the register contained logical "1's". This configuration of data in the shift register would be equivalent to stretching the initial stored point into a line depicted on FIG. 2A which ran along the constant $\theta$ orthogonal (or ray) corresponding to row L of the register. This sign fill facility is useful because of the possibility that the initially stored point in fact represented an end portion of a line the remainder of which lay in the area immediately surrounding the origin of the grid of FIG. 2A where further definition of that line was impossible. This "sign-fill" facility may be replaced by "zero-fill" in alternating embodiments on the left boundary should this line-stretching feature be undesirable.

As an example of the zero-fill facility, it will be noted that AND gate 139 of FIG. 9 is "tied down" so that upon activation of the SHIFT LEFT 1 signal a logical "0" will always be stored in (N,L) storage element 136. Assuming, therefore, that all of the storage elements of row L initially had logical "1"s "0"s stored in them, successive left shifts of the data stored in the shift register would result eventually in all of these elements having logical "0" stored in them. The operation of shifting left would thus result in the contraction of the line represented by the original data towards the origin of the grid of FIG. 2A.

An alternative embodiment of the two-dimensional shift register illustrated by FIG. 8 could be useful for storing and operating on data corresponding to digitized representations of images on a Cartesian grid system. In such an embodiment, such as the frame buffer 77 of FIG. 7, shifts of data to the left or to the right in the register would correspond to displacements of the image to the left or right on the grid, and shifts of data up or down in the register would correspond to displacing the image in an up or down direction on the grid.

This alternative embodiment would not require all the features described in the discussion of FIG. 8 above. It may be desirable, however, to prevent the permanent loss of data resulting from that data being shifted beyond the bounds of the shift register. This loss of data could be prevented by configuring the shift register such that the number of rows and columns of storage elements comprising it exceeded the number of X and Y orthogonals of the corresponding Cartesian grid by any desired amount. Thus, for example, data which was shifted to the left into one of the storage elements contained in one of the "extra" columns of the shift register could be retrieved at a later time by simply shifting it back to the right.

This embodiment of the two-dimensional shift register of the present invention could be particularly useful, for example, for performing the previously discussed normalization or denormalization operations. Using the shift register in such a manner, the data in the shift register could be shifted so that the data in the storage element corresponding to the center of rotation or dilation would be moved to the storage element corresponding to the origin of the display grid. Since all of the data in the shift register is shifted in a parallel fashion the result of the shifting operation would correspond to an equivalent shift of the entire image.

Figure 10:
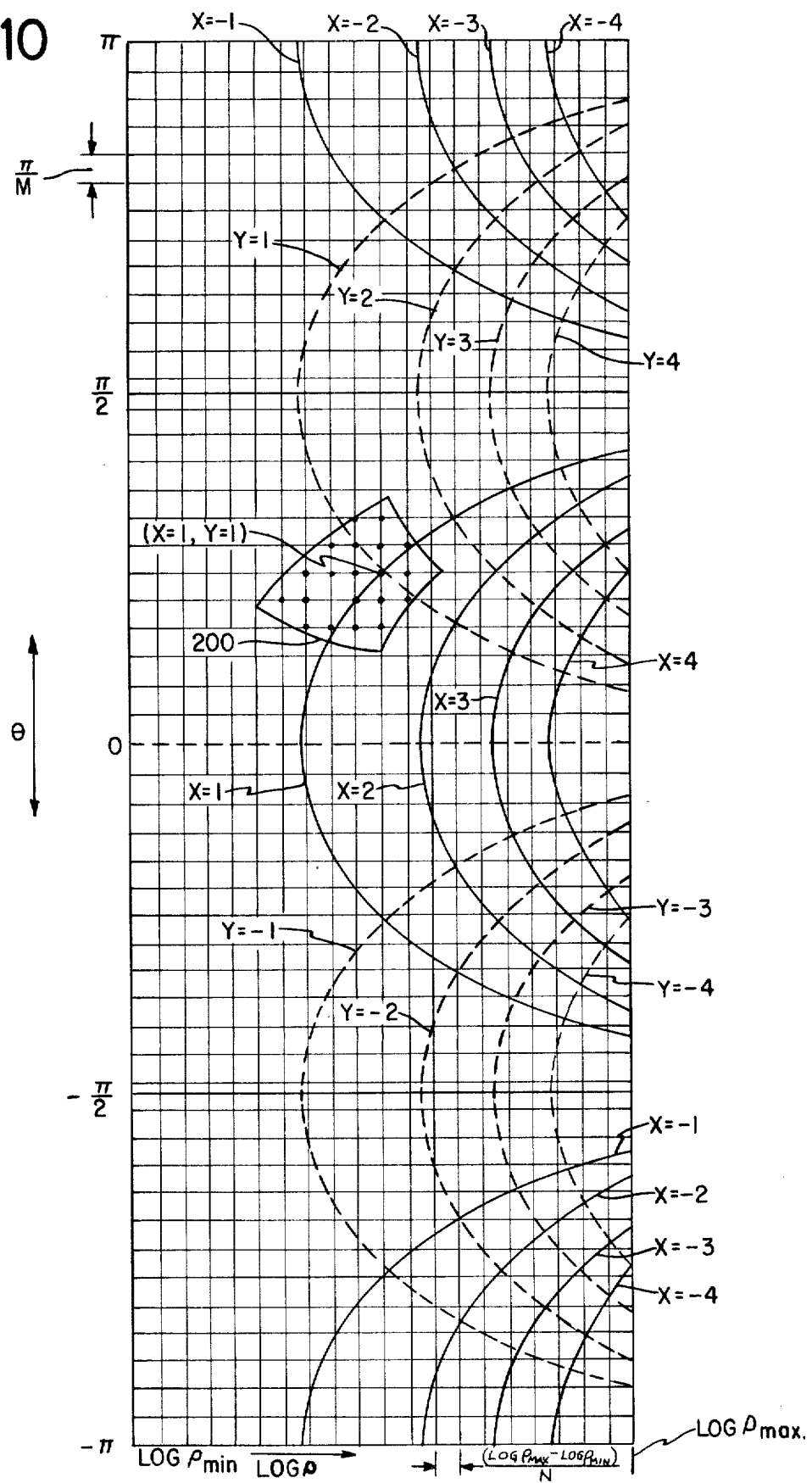
FIG. 10 is a representation of straight lines of the Cartesian coordinate system under logarithmic mapping.

A more complete understanding of further advantageous embodiments of the two-dimensional shift register of the present invention may be gained by reference to FIG. 10. FIG. 10 illustrates a complex logarithmic grid in which each vertical orthogonal represents a particular constant value of $\log \rho$ and each horizontal orthogonal represents a particular constant value of $\theta$.

It will be appreciated that a two-dimensional shift register as described above may be constructed so that it includes a storage element corresponding to each of the points of intersection of the horizontal and vertical orthogonals of FIG. 10. Thus, if FIG. 10 contained N vertical orthogonals and M horizontal orthogonals, the corresponding shift register would be arranged to comprise N columns and M rows of storage elements. A shift upward or downward of the data in any given storage element to an adjoining element would correspond to an angular movement of the point on the complex exponential plane represented by that data by an amount $2\pi/M$ radians. Similarly, a leftward or rightward shift of the data contained in any given storage element to its adjoining storage element would represent a change in the corresponding point's radial distance from the origin in the complex exponential plane by a factor of $(P_{MAX})^{1/N}$, where $P_{MAX}$ represents the maximum distance from the origin which may be represented in the grid.

FIG. 10 will be further noted to contain a plurality of curved solid lines and a plurality of orthogonal curved broken lines. In the illustrative example, each of the solid curved lines represents the image of an orthogonal in a Cartesian plane for a particular value of X as plotted on the complex logarithmic grid of FIG. 10. The broken lines represent the corresponding Y orthogonal of a Cartesian plane. Thus, the curved lines represent in the example shown, the complex image of a Cartesian grid comprising unit spaced X and Y orthogonals which are assigned values between $-4$ and $+4$.

It will now be noted that if the number of rows and columns of the above-described two-dimensional shift register representing the complex logarithmic plane are appropriately selected, there will be a storage element within that shift register which approximates each intersection point of the solid and broken curves of FIG. 10 to any desired degree of accuracy. Taking advantage of this principle, the shift register may now be provided with means for shifting the data contained in any one of these storage elements right or left to the storage element corresponding to the adjoining Y orthogonal (broken line), or up or down to the storage element corresponding to the adjoining X orthogonal (solid line). These shifts of data correspond to the corresponding horizontal or vertical movements of the image in the Cartesian plan which is represented by the data. Such a register could be adapted to serve, for example, as the frame buffer of a display system by further providing means for randomly addressing the storage elements of the shift register for writing data into or reading data out of them. As will be further noted from FIG. 10, the described shift register will typically contain many storage elements in addition to those elements representing the intersection points of a Cartesian grid. The random access addressing facility of the shift register may be constructed, however, so as to access only those storage elements corresponding to the Cartesian grid intersection points. It will now be appreciated that if the data contained in a storage element corresponding to a Cartesian intersection point were shifted by a particular multiple of $$\rho MAX - \rho MIN$$

or $2\pi/M$, the data contained in the original storage element could end up in a storage element not corresponding to any particular point in the Cartesian grid system. This problem is avoided, however, in a preferred embodiment, by providing means for simultaneously reading the contents of all of the storage elements in a "neighborhood" surrounding each storage element corresponding to a Cartesian intersection point. (The "neighborhood" of any storage element corresponding to a Cartesian intersection point being defined as that group of storage elements which lie closer to it than to any other storage element representing another Cartesian grid intersection point). For example, the neighborhood of the storage element corresponding to the $X = 1$, $Y = 1$ point of the Cartesian grid would be all of those storage elements in the shift register corresponding to the intersection points of the orthogonals of the complex logarithmic grid which lie within the area 200 of FIG. 10.

The above simultaneous reading means may comprise, for example, a conventional "OR" circuit to which the outputs of all of the storage elements in each neighborhood are connected. Thus, the data provided by a random access read of the storage element in the neighborhood corresponding to a Cartesian intersection point would be the logical "OR" of the data contained in all of the storage elements comprising the neighborhood.

In a preferred embodiment of the above-described shift register, each of the storage elements is a conventional flip-flop circuit capable of storing one bit of binary data. If, therefore, the storage element in that shift register corresponding to the coordinates $X = 1$, $Y = 1$ in a Cartesian grid were accessed for reading the data stored in it, a logical "1" would be read if that element contained a logical "1" or if any other storage elements in its "neighborhood" contained a logical one.

It will be seen that the above-described shift register is capable of performing all of the operations described in the discussion relating to FIG. 7. Since each storage element within the shift register which corresponds to an intersection point in a Cartesian grid also corresponds to an intersection point in a complex logarithmic grid, there is no need for the separate Cartesian-to-log-spiral converter 75 of FIG. 7. The means described above for reading data out of the shift register performs, in effect, the function of the log-spiral-to-Cartesian converter 76 of FIG. 7. Furthermore, the register is adapted to perform any operations of translation, rotation or dilation of an image as may be required.

It will be understood that in the appended claims the term "cell" may designate either an elemental area of an actual visible image or scene, or electronic signals representative of such an elemental area and having components representing the location (e.g. coordinates) of the elemental area and data representative of the nature (e.g. brightness, color, height or the like) of the elemental area. In such an embodiment, the logical "OR" most recently described in the preceding paragraphs would be replaced by a function which represents the data in neighborhood 200 of FIG. 10 as the average of the data values in that neighborhood.

What is claimed as the invention is:

1. An image processing system comprising: means for converting the image to be processed into a plurality of representative image cells; and means for concurrently arranging representations of said cells in accordance with a predetermined pattern to produce a geometrically transformed representation of the image, successive geometric transformations of the image being congruent irrespective of changes in scale or angular orientation of the image.

2. The system of claim 1 in which said converting means comprises a plurality of light receptors arranged in an array defining an image-receiving plane.

3. The system of claim 2 in which said arranging means comprises an array of light-responsive elements each of which is optically connected to a corresponding one of said receptors such that each of said elements produces a signal representative of one of said image cells.

4. The system of claim 2 in which said light receptors are arranged in a grid pattern defining a complex logarithmic coordinate system.

5. The system of claim 3 or 4 in which said light-responsive elements are arranged in an image-display pattern defining a rectilinear coordinate system.

6. The system of claim 4 in which said light receptors are arranged in a pattern defined by a plurality of exponentially spaced concentric rings intersected by a plurality of equilangularly spaced radial lines.

7. A system as in any one of claims 1-4 or 6 in combination with:
  means providing a transformed representation of a template of said image with selected scale and rotational orientation;
  a comparator for comparing said template transformed representation with said image transformed representation to indicate positional correspondence between such representations;
  means for operating on said image transformed representation to simulate incremental scale and rotational changes of said image to shift said image transformed representation to achieve a match with the selected scale and rotational orientation of said template transformed representation thereby to determine scale and rotational difference between said predetermined representations; and
  means for indicating the respective number of incremental scale and rotational changes required to determine a match between said image and template representations.

8. A system as in claim 7 for handling an object providing said image, in combination with:
  means for producing said image from said object, and
  means responsive to the magnitude and direction of said shift for manipulating said object.

9. A system as in any one of claims 1-4 or 6 in combination with:
  means providing a transformed representation of a template of said image with selected scale and rotational orientation;
  a comparator for comparing said template transformed representation with said image transformed representation to indicate positional correspondence between such representations;
  means for shifting one of said transformed representations relative to the other until said comparator indicates positional correspondence therebetween, whereby the amount and direction of such shift is indicative of the scale relationship and angular relationship between said image and said template.

10. A system as in claim 9 for handling an object providing said image, in combination with:
  means for producing said image from said object, and
  means responsive to the magnitude and direction of said shift for manipulating said object.

11. An image-processing system comprising:
  means producing a plurality of picture cells representative of an image to be processed; and
  means for concurrently converting said cells into respective transformed cells representative of a transformed version of said image, which image version is invariant in size and shape with respect to rotations and dilations of said image.

12. A system as in claim 11, wherein each of said transformed cells is derived from an original cell by a complex logarithmic transformation.

13. A system as in claim 11 wherein each of said transformed cells is derived from an original cell by a tranformation from an exponential ray/ring grid to a Cartesian grid.

14. A system as in claim 12 wherein each of said transformed cells is derived from an original cell by a transformation from a grid formed by orthogonal logarithmic spirals to a skewed Cartesian grid.

15. A system as in claim 12 wherein each of said transformed cells is derived from an original cell by a tranformation from a lattice of angularly related logarithmic spirals to an equilateral triangular lattice.

16. A system for processing an image represented by a plurality of picture cells arranged in a Cartesian coordinate system, comprising:
  means for converting the arrangement of said cells to a logarithmic spiral coordinate system;
  means for shifting all said cells in said logarithmic spiral coordinate system by an amount representing a desired rotation and dilation of said image; and
  means deriving an image-producing signal from said shifting means wherein said signal represents a second image which is essentially identical to said first image in all respects other than scale or angular orientation.

17. A system for processing an image represented by a plurality of picture cells arranged in a Cartesian coordinate system, comprising:
  means for converting the arrangement of said cells to a ray and exponentially spaced ring coordinate system;
  means for shifting all said cells in said ray and ring coodinate system by an amount representing a desired rotation and dilation of said image; and
  means deriving an image-producing signal from said shifting means wherein said signal represents a second image which is essentially identical to said first image in all respects other than scale or angular orientation.

18. A system for processing an image represented by a plurality of picture cells arranged in a grid laid out in accordance with a log spiral coordinate system, comprising:
  means for concurrently shifting the position of each of said picture cells by a fixed amount representing desired image rotation and/or dilation; and
  means for converting the arrangement of said shifted cells to a grid laid out in accordance with a Cartesian coordinate sytem, whereby an image-producing set of picture cells representing a rotated and/or dilated version of said image is produced.

19. A system for processing an image represented by a plurality of picture cells arranged in a grid laid out in accordance with a log spiral coordinate system, comprising:
  means for horizontally shifting all said picture cells by a fixed amount representing desired image dilation; and
  means for converting the arrangement of said shifted cells to a grid laid out in accordance with a Cartesian coordinate system, whereby an image-producing set of picture cells representing a dilated version of said image is produced.

20. A system for processing an image represented by a plurality of picture cells arranged in a grid laid out in accordance with a log spiral coordinate system, comprising:
means for vertically shifting all said picture cells by a fixed amount representing desired image rotation; and
means for converting the arrangement of said shifted cells to a grid laid out in accordance with a Cartesian coordinate system, whereby an image-producing set of picture cells representing a rotated version of said image is produced.

21. An image-processing system for a digitized image signal representative of an image having a plurality of picture cells arranged in a Cartesian grid with equally spaced rows and columns of cells, with one of said cells being an origin, and with each of said cells having a location defined by a set of individual Cartesian coordinates, and also having a state defined by respective data associated with said coordinates, said system comprising:
means for transferring the data of each cell to a location having transformed coordinates representing a mapping of the cell's Cartesian coordinates upon a log-spiral coordinate system;
means for shifting the locations of all said transformed coordinate cell data by the same amount representative of a desired image rotational displacement; and
means for re-transferring said shifted-coordinate cell data to locations with re-transformed coordinates representing a mapping of log-spiral coordinates upon a Cartesian coordinate system, to produce a digitized image signal representative of a rotated version of said original image.

22. An image-processing system for a digitized image signal representative of an image having a plurality of picture cells arranged in a Cartesian grid with equally spaced rows and columns of cells, with one of said cells being an origin, and with each of said cells having a location defined by a set of individual Cartesian coordinates, and also having a state defined by respective data associated with said coordinates, said system comprising:
means for transferring the data of each cell to a location having transformed coordinates representing a mapping of the cell's Cartesian coordinates upon a log-spiral coordinate system;
means for shifting the locations of all said transformed coordinate cell data by the same amount representative of a desired image dilation; and
means for re-transferring said shifted-coordinate cell data to locations with re-transformed coordinates representing a mapping of log-spiral coordinates upon a Cartesian coordinate system, to produce a digitized image signal representative of a dilated version of said original image.

23. A system as in claim 21 or 22, further including:
means for normalizing said digitized image signal by shifting the data of each of said cells to new coordinates differing from its original coordinates by an amount representing the displacement from said origin of a desired point of image rotation and/or dilation.

24. A system as in claim 23, further including:
means for denormalizing said produced digitized image signal by shifting each cell data to new coordinates differing from its re-transformed coordinates by said displacement from origin.

25. A system as in claim 21 or 22 wherein said mapping is represented by $$W = e^Z$$

where $Z$ is the complex number representation of each point of the Cartesian grid, and $W$ is the complex number representation of each point of the log spiral coordinate system.

26. A system as in claim 21 or 22 wherein each ordinate line of the Cartesian grid is mapped into a circle of the log spiral coordinate system, and each abscissa line of the Cartesian grid is mapped into a radial line of said log spiral coordinate system.

27. A system as in claim 21 or 22, wherein said mapping is effected by transforming orthogonal lines of the Cartesian grid into respective orthogonal logarithmic spirals.

28. A system as in claim 21 or 22 wherein said mapping is effected by transforming an equilateral triangular lattice of the Cartesian grid into a lattice formed of angularly related logarithmic spirals.

29. An image-processing system for an image having a plurality of picture cells arranged in a Cartesian grid with equally spaced rows and columns of cells, and one of said cells being an origin, comprising:
means for digitizing said cells;
means for normalizing said cells to transfer said origin to a desired point of image rotation and/or dilation;
means for transferring each of said cells having a Cartesian grid location defined by the complex number $W = u + iv$ to a respective cell of a log spiral coordinate grid having a location defined by the complex number $Z = e^W$;
means for shifting said latter cells vertically by an amount corresponding to desired image rotation;
means for shifting said latter cells horizontally by an amount corresponding to a desired image dilation;
means for re-transferring said shifted cells to respective corresponding locations in said Cartesian grid;
means for denormalizing said cells to transfer said point of image rotation and/or dilation to said origin; and
means for displaying said denormalized cells to provide an image which is a rotated and/or dilated version of said original image.

30. A two-dimensional shift register comprising:
a plurality of storage elements allocated to N columns and M rows, each of said columns containing M of said storage elements and each of said rows containing N of said storage elements;
a first one of said rows being designated as an uppermost row, and an Mth one of said rows being designated as a lowermost row;
a first one of said columns being designated as a leftmost column and an Nth one of said columns being designated as a rightmost column;
each of said storage elements being adapted to have data entered into or read out of said storage element;
means responsive to a first (e.g. "Shift Left") or a second (e.g. "Shift Right") predetermined signal for moving the data stored in each of said storage elements of certain columns to a corresponding one of said storage elements in the same row and a preselected number of columns closer to said "leftmost" column for said first signal or closer to said "rightmost" column for said second signal; and means responsive to a third (e.g. "Shift Up") or fourth (e.g. "Shift Down") signal for moving the data stored in each of said storage elements to a corresponding one of said storage elements in the same column and a preselected number of rows closer to said "uppermost" row for said third signal or closer to said "lowermost" row for said fourth signal.

31. A two-dimensional shift register in accordance with claim 30 further comprising:

means responsive to said third signal for moving the data contained in each of said storage elements of said "uppermost" row to a corresponding one of said storage elements in the same column and a preselected number of rows from, said "lowermost" row; and means responsive to said fourth signal for moving the data contained in each of said storage elements of said "lowermost" row to a corresponding one of said storage elements in the same column and a preselected number of rows from, said "uppermost" row.

32. A two-dimensional shift register in accordance with claim 31 further comprising:

means responsive to said second signal for storing into each of said storage elements of said "leftmost" column the data which was contained in that storage element previous to the activation of said second signal.

33. A two-dimensional shift register in accordance with claim 31, further comprising:

means responsive to the activation of said first (e.g. "Shift Left") signal for resetting to zero each of said storage elements of said "rightmost" column.

34. Apparatus for performing transformations upon an image which is displayable within an image space which is divided into a plurality of picture cells arranged in a predetermined pattern for displaying in each cell a portion of said image, comprising:

means for generating one or more control signals;

a two-dimensional shift register including a plurality of storage elements arranged in N columns and M rows of said shift register, each of said columns containing M of said storage elements and each of said rows containing N of said storage elements, said register also including means for storing data representing the portion of said image displayable by each cell into the corresponding storage element or for reading data out of said storage elements, means responsive to a first one (e.g. SHIFT LEFT) of said control signals or a second one (e.g. SHIFT RIGHT) of said control signals for moving the data stored in each of said storage elements to a corresponding storage element in the same row and a preselected number of columns to the left or to the right, respectively, means responsive to a third one (e.g. SHIFT UP) of said transformation signals or a fourth one (e.g. SHIFT DOWN) of said transformation signals for moving the data stored in each of said storage elements to a corresponding storage element in the same column of storage elements and a preselected number of rows up or down, respectively; and means for displaying a transformed image including means for activating each of said picture cells in a predetermined manner responsive to the data stored in its corresponding ones of said storage elements.

35. Apparatus in accordance with claim 34 wherein:

said picture cells are arranged as a Cartesian grid comprising equally spaced rows and columns of said cells, one of said cells comprising an origin point of said grid;

each one of said columns of cells corresponding to one of said columns of storage elements of said two-dimensional shift register; and each one of said rows of cells corresponding to one of said rows of storage elements of said two-dimensional shift register.

36. A method of processing an image comprising the steps of:

deriving from the image a plurality of representative image cells; and arranging representations of said cells in a concurrent manner in accordance with a predetermined pattern to produce a geometrically transformed version of the image, successive geometric transformations of the image being congruent irrespective of changes in scale or angular orientation of the image.

37. A method as in claim 36 wherein said pattern is derived from a cartesian lattice by a complex logarithmic transformation.

38. A method of processing an image comprising the steps of producing a plurality of picture cells representative of said image; and converting said cells in a concurrent manner into respective transformed cells representative of a transformed version of said image which transformed version is invariant in size and shape with respect to dilations and rotations of the image to be processed.

39. A method as in claim 38 wherein said converting comprises deriving the location of each of said transformed cells from that of an original cell by a complex logarithmic transformation.

40. A method as in claim 39 wherein said transformation is from a cartesian grid to an exponential ray/ring grid.

41. A method as in claim 39 wherein said transformation is from a skewed cartesian grid to a grid formed by orthogonal logarithmic spirals.

42. A method as in claim 39 wherein said transformation is from an equilateral triangular lattice to a lattice of angularly related logarithmic spirals.

43. A method as in claim 36 or 38 further including the steps of:

producing signals representative of a transformed version of a template of said image with selected scale and selected rotational orientation;

shifting one of said transformed versions in simulation of incremental scale and rotational changes of said image until said shifted transformed version matches the other transformed representation match, whereby the nature of said shift is indicative of the scale and orientational relationship between said template image and said original image.

44. A method as in claim 43 wherein said image is derived from each of a plurality of geometrically similar physical objects of random orientations, and further comprising the step of:

orienting each said physical object in accordance with said scale and orientational relationship, to provide a uniform orientation for said objects.

45. A method of processing an image represented by a plurality of picture cells arranged in a Cartesian coordinate system comprising the steps of:

converting the locations of said cells to corresponding locations in a logarithmic spiral coordinate system;

shifting the locations of all said converted cells in a concurrent manner by an amount representing a desired rotation and/or translation of said image being processed; and deriving an image-producing signal from said shifted cells.

46. A method for processing an image represented by a plurality of picture cells arranged in a Cartesian coordinate system comprising the steps of:

converting the locations of said cells to corresponding locations in a ray and exponentially spaced ring coordinate system; and shifting the locations of all said converted cells in a concurrent manner by an amount representing a desired rotation and/or translation of said image being processed; and deriving from said shifted cells an image producing signal.

47. A method for processing an image represented by a plurality of picture cells arranged in a log-spiral coordinate system comprising the steps of:

shifting the locations of all said picture cells in a concurrent manner by a fixed amount representing desired image rotation and/or dilation; and converting said shifted cells to a Cartesian coordinate system for producing an image-producing signal representing a rotated and/or dilated version of said image.

48. A method as in claim 47 wherein said shifting is performed horizontally on all picture cells by a fixed amount representing desired image dilation, for producing a signal representing a dilated version of said original image.

49. A method as in claim 47 wherein said shifting is performed vertically on all said picture cells by a fixed amount representing a desired image rotation, for producing a signal representing a rotated version of said original image.

50. Data processing apparatus comprising:

a first set of data storage elements allocated respectively to the cells of a first (e.g. exponential ring and ray) coordinate grid;

a second set of data storage elements allocated respectively to the cells of a second (e.g. Cartesian) coordinate grid;

a data path coupling each storage element of said first set to the respective element of said second set having substantially the same coordinate values in said second coordinate grid as said first-set storage element has in said first coordinate grid;

said data paths being adapted to transmit data between each storage element and its respective coupled storage element; and further data paths from each second-set elements having substantially the same value of either coordinate of said second-set storage element.

* * * * *